US012782932B2

(12) United States Patent
Decker et al.

(10) Patent No.: US 12,782,932 B2
(45) Date of Patent: Nov. 3, 2026

(54) METHOD FOR CONTROLLING TRAVELING OPERATION OF A SELF-PROPELLED GROUND COMPACTION MACHINE, AND GROUND COMPACTION MACHINE

(71) Applicant: BOMAG GMBH, Boppard (DE)

(72) Inventors: Peter Decker, Boppard (DE); Timo Loew, Boppard (DE)

(73) Assignee: BOMAG GMBH, Boppard (DE)

( * ) Notice: Subject to any disclaimer, the term of this patent is extended or adjusted under 35 U.S.C. 154(b) by 897 days.

(21) Appl. No.: 17/804,135

(22) Filed: May 26, 2022

(65) Prior Publication Data

US 2022/0382276 A1 Dec. 1, 2022

(30) Foreign Application Priority Data

May 26, 2021 (DE) ..................... 10 2021 002 728.0

(51) Int. Cl.

| | |
|---|---|
| ***G05D 1/24*** | (2024.01) |
| ***E01C 19/00*** | (2006.01) |
| ***G05D 1/00*** | (2006.01) |
| *E01C 19/26* | (2006.01) |
| *E01C 19/40* | (2006.01) |

(Continued)

(52) U.S. Cl.

CPC ......... *G05D 1/0022* (2013.01); *E01C 19/004* (2013.01); *G05D 1/0214* (2013.01); *E01C 19/26* (2013.01); *E01C 19/40* (2013.01); *E01C 21/00* (2013.01); *E02D 3/046* (2013.01)

(58) Field of Classification Search

CPC .. G05D 1/0022; G05D 1/0214; E01C 19/004; E01C 19/26; E01C 19/40; E01C 21/00; E02D 3/046; B60W 30/12; B60W 2552/53

See application file for complete search history.

(56) References Cited

U.S. PATENT DOCUMENTS

| | | | |
|---|---|---|---|
| 7,076,346 B2 * | 7/2006 | Sturges .................. | E21F 13/08 299/1.7 |
| 7,491,014 B2 | 2/2009 | Sick | |
| 8,672,582 B2 | 3/2014 | Loew et al. | |

(Continued)

FOREIGN PATENT DOCUMENTS

| | | |
|---|---|---|
| DE | 102010017902 | 11/2010 |
| DE | 102012017777 | 3/2014 |

(Continued)

OTHER PUBLICATIONS

Office Action from related Japanese Appln. No. 2022-085573, dated Jun. 20, 2023. English translation attached.

*Primary Examiner* — Wilson W Tsui
(74) *Attorney, Agent, or Firm* — Secant IP, PLLC

(57) ABSTRACT

Methods for controlling the traveling operation of a self-propelled ground compaction machine with the aid of a control unit which provides travel control signals to a travel drive system of the ground compaction machine. The ground compaction machine may alternatively be operated in an operator mode in which travel specifications specified by an operator via a manually operable input device are transmitted to the control unit and are transmitted by the latter in the form of travel control signals to the travel drive system of the ground compaction machine. A ground compaction machine, in particular a vibratory plate or a trench roller.

23 Claims, 10 Drawing Sheets

(51) Int. Cl.
*E01C 21/00* (2006.01)
*E02D 3/046* (2006.01)

(56) References Cited

U.S. PATENT DOCUMENTS

| | | | | |
|---|---|---|---|---|
| 9,261,881 | B1 * | 2/2016 | Ferguson | B60W 10/04 |
| 9,267,245 | B1 * | 2/2016 | Braun | B62D 12/00 |
| 11,691,648 | B2 * | 7/2023 | Theverapperuma | G06V 10/454 701/25 |
| 2004/0215393 | A1 * | 10/2004 | Matsumoto | B60T 8/17557 701/41 |
| 2009/0271071 | A1 * | 10/2009 | Buerkel | B60T 8/17557 701/1 |
| 2014/0156134 | A1 * | 6/2014 | Cullinane | B60W 60/0059 701/23 |
| 2017/0259819 | A1 * | 9/2017 | Takeda | B60W 30/18163 |
| 2017/0329345 | A1 * | 11/2017 | Prasad | G08G 1/167 |
| 2018/0206392 | A1 * | 7/2018 | Matsuzaki | A01B 76/00 |
| 2019/0291728 | A1 * | 9/2019 | Shalev-Shwartz | B60W 10/20 |
| 2019/0362198 | A1 * | 11/2019 | Averbuch | G01S 13/931 |
| 2020/0089230 | A1 * | 3/2020 | Oetken | E02F 9/205 |
| 2021/0247514 | A1 | 8/2021 | Horn | |
| 2021/0276596 | A1 * | 9/2021 | O'Donnell | E02F 3/967 |
| 2021/0278860 | A1 * | 9/2021 | McGee | B60K 35/10 |

FOREIGN PATENT DOCUMENTS

| | | |
|---|---|---|
| DE | 102017011147 | 6/2019 |
| EP | 2947205 | 11/2015 |
| JP | 61-294512 | 12/1986 |
| JP | 2006-522881 | 10/2006 |
| JP | 2010-211512 | 9/2010 |
| JP | 2020-079529 | 5/2020 |
| KR | 10-2018-0051299 | 5/2018 |
| WO | 2020/088782 | 5/2020 |

* cited by examiner

METHOD FOR CONTROLLING TRAVELING OPERATION OF A SELF-PROPELLED GROUND COMPACTION MACHINE, AND GROUND COMPACTION MACHINE

FIELD

The invention relates to a method for controlling traveling operation of a self-propelled ground compaction machine and to a ground compaction machine, in particular for carrying out the method according to the invention.

BACKGROUND

Ground compaction machines generally have a wide range of applications and are known to be used in the context of construction measures for the compaction of the ground due to their own weight (static compaction) or due to additionally acting compaction devices (dynamic, for example imbalance exciters). Self-propelled ground compaction machines are characterized by the fact that they have a drive device that provides the drive energy required to operate the ground compaction machine. In this case, the ground compaction machine itself generates the drive energy required for traveling and steering movements, for example with the aid of an internal combustion engine and/or electric motor. The drive device may have a travel drive that drives a movement of the machine in a direction of travel. The direction of travel indicates the current direction of movement of the ground compaction machine. Said direction of movement may be in forward or reverse direction. The forward direction may be specified by definition. Such ground compaction machines may further be steerable. Steering movements driven by the ground compaction machine itself may be effected either via the travel drive or with the aid of a steering drive. For this purpose, various steering options are described in the prior art, such as articulated steering, differential ("tank") steering or steering based on motion coordination of imbalance exciters. It is important to note that "steerable" herein refers to a steering movement driven by the ground compaction machine itself and not to a steering movement achieved by an operator applying force to the ground compaction machine. The travel drive device may be, for example, a travel drive motor, in particular a hydraulic or electric motor, which drives a rotary movement of a travel unit rolling on the ground, such as a wheel or a drum, about a horizontal rotation axis. These machines typically comprise one or more essentially barrel-shaped drums rolling on the ground as ground-contacting devices. Such a machine in the form of a so-called trench roller is disclosed, for example, in DE102010014902A1. Additionally or alternatively, the drive motor may also drive an imbalance exciter, in which case the centrifugal forces generated may also produce a travel movement in a direction of travel. This approach is used, for example, in so-called vibratory or vibrating plates, whose ground-contacting device is usually a compaction plate resting on the ground. Such a ground compaction machine is described, for example, in DE102012017777A1.

So-called ride-on ground compaction machines are also known, the essential feature of which is that the operator sits on the machine itself, operates it and rides on it during operation. Such a machine is also disclosed, for example, in DE102012017777A1. Alternatively, there are hand-guided ground compaction machines wherein the operator walks behind the ground compaction machine during operation and steers it, for example, via a drawbar or a guide bar and/or provides further operating inputs, as described inter alia in EP2947205A1. In the prior art, remote-controlled ground compaction machines are also already known, the essential feature of which is that an operator located in the vicinity of the ground compaction machine can control the machine via remote control at least partially in terms of travel and steering commands. This is also already known, for example, from DE102010014902A1. Such machines are also commonly assigned to the group of so-called hand-guided ground compaction machines.

Ground compaction work often places increased demands on the operator, especially when working in confined spaces and/or over long distances. One application situation that combines these two challenges in a particularly striking manner is the compaction of the ground in trenches, such as encountered in the construction of pipelines, other routes, canals, etc., over long distances. Trenches are ultimately longitudinal ground depressions that, for the most part, have sidewalls along their longitudinal extension which rise from the bottom of the trench more or less vertically straight or at an angle. The horizontal distance between the two trench walls defines the trench width. The depth of the trench indicates the vertical distance from the bottom of the trench or trench bed to the top end of a sidewall. A trench may also be covered vertically toward the top by a trench ceiling at least in sections. For safety reasons, it is advantageous if the operator is not inside the trench together with the ground compaction machine, for example to prevent a collision of the ground compaction machine with the operator in confined spaces. In addition, the use of internal combustion engines may result in accumulation of exhaust gases in the interior of the trench. A typical application situation therefore involves the operator operating the ground compaction machine located in the trench from outside the trench via remote operation or remote control and moving along with the ground compaction machine over long distances. This may be perceived as tiring by the respective operator, especially in the case of long working distances.

SUMMARY

Against this background, the object of the invention is to provide a way to improve the operation of a ground compaction machine, especially for compaction work within trenches.

The object is achieved with a method for controlling traveling operation of a self-propelled ground compaction machine and a ground compaction machine according to the independent claims. Preferred embodiments are cited in the dependent claims.

One aspect of the invention relates to a method for controlling traveling operation of a self-propelled ground compaction machine using a control unit that provides travel control signals to a travel drive system of the ground compaction machine. The method according to the invention is particularly suitable for controlling traveling operation of a self-propelled trench roller or a self-propelled vibratory plate.

A ground compaction machine of the type relevant herein comprises a ground-contacting device via which the ground to be compacted is contacted and compacted. Further, a travel drive device is provided to drive the travel movement of the ground compaction device by its own power. For this purpose, for example, at least one electric or hydraulic motor or a drive gear coupled to a primary drive unit may be used. The drive energy required for self-propelled operation of the ground compaction machine may be generated on the ground compaction machine during operation via a primary drive unit, such as an internal combustion engine, an electric motor, a fuel cell, etc., or it may be carried along with the aid of an energy storage, for example a storage device for electrical energy. It will be appreciated that, depending on the design, intermediate transmission devices, such as gearboxes, etc., may be used. Hybrid primary drive units may also be used.

Based on this basic structure of a generic ground compaction machine, a trench roller in particular is characterized by the fact that it comprises at least two ground compaction drums, which are each rotatable about a horizontal rotation axis extending transversely to the working direction and are arranged one behind the other in the working direction, said drums having an outer circumferential surface which may be smooth or, for example, have so-called sheep feet. One or both of the drums comprise a travel drive motor, in particular a hydraulic or electric motor, which drives the rotary movement of the respective drum about the rotation axis. There may also be more than one drum arranged next to each other at the level of one of the rotation axes. Known trench rollers may have a single-piece machine frame or a multi-part machine frame, for example comprising a front frame and a rear frame connected by an articulated joint. The drive energy of such a trench roller is often provided via an internal combustion engine which drives one or more downstream hydraulic pumps and/or a generator to produce hydraulic and/or electrical energy. Electromotive operation is also conceivable, in which the trench roller carries an electrical energy storage, for example. The trench roller could also comprise a fuel cell to generate electrical energy. Imbalance exciters may be provided in the drums. In this case, the ground-contacting device is configured as barrel-shaped drums.

A vibratory plate, on the other hand, does not comprise any compaction drums rolling on the ground, but a usually essentially plate-shaped ground-contacting element as ground-contacting device. In such machines, the advancing movement in one direction of travel is generated by accordingly adjusting the provided imbalance exciters in a manner known per se. The provided imbalance exciters may be driven, for example, by hydraulic and/or electric drive motors and/or by means of a drive gear in drive connection with a primary drive unit. For the energy supply of these drive motors and/or for driving the imbalance exciters, a primary drive unit may be provided either likewise in form of an internal combustion engine, to drive, for example, a generator and/or a hydraulic pump or for direct drive, or in form of a storage device for electrical energy. Fuel cells or the like are also possible.

A generic ground compaction machine further comprises a control unit, with the aid of which received operating inputs, such as, for example, travel direction, speed and/or steering commands, are converted into actual travel control signals via which components of the drive system, such as, for example, a steering actuator, a drive motor of an imbalance exciter and/or a travel motor, etc., are controlled by the control unit. Drive control signals thus denote control signals generated by the control unit, via which the operation of driven components of the ground compaction machine is controlled. Travel control signals include those control signals of the control unit which control the traveling operation of the ground compaction machine. This includes, for example, control signals relating to changes in the direction of travel (for example, forward, backward, cornering, etc.) and/or the traveling speed (for example, accelerating, decelerating, stopping, etc.).

According to the invention, the ground compaction machine may allow a rather conventional operating mode in which the operation of the ground compaction machine, in particular with regard to travel specifications, such as, for example, travel direction and/or speed and/or steering commands, is carried out via inputs manually specified by an operator via a suitable input device. In this operating mode, hereinafter referred to as "operator mode", travel specifications specified by an operator via a manually operable input device are transmitted to the control unit of the ground compaction machine and are forwarded by the latter in the form of travel control signals to the drive system of the ground compaction machine for actual control of the machine itself. The corresponding inputs are effected in particular either via operating elements of the input device installed directly on the ground compaction machine and/or with the aid of a remote control system comprising a remote control to be worn by the operator as input device, which is in signal connection with the ground compaction machine itself via a, preferably wireless, signal transmission connection. Such a remote control system is disclosed, for example, in DE102010014902A1.

The method and ground compaction machine according to the invention are now characterized by the fact that, in particular in addition to the operator mode described above and known per se, the machine control system, in particular also, allows a so-called autonomous mode. The "autonomous" operating mode is characterized by the fact that the control unit of the machine generates travel specifications itself independently of inputs via the manually operable input device, i.e., without such manually specified travel commands, and transmits them to the drive system of the ground compaction machine in the form of travel control signals. In autonomous mode, the ground compaction machine thus starts and/or continues and/or changes a travel movement with regard to travel speed and, in particular, also with regard to travel direction, without requiring any input from the operator. In other words: In autonomous mode, the control unit thus makes decisions on its own regarding the direction and speed of travel without any prior manual command input by an operator. It is now essential that the control unit makes the possibility of operating the ground compaction machine in autonomous mode dependent on the condition that at least one sidewall is present adjacent to the ground compaction machine. This is to ensure that the autonomous mode is ideally only enabled and permitted by the control unit when the ground compaction machine is in a ground depression, in particular in a trench. It is thus provided that operation of the ground compaction machine in the autonomous mode is enabled by the control unit only if and/or as long as a sidewall detection device of the ground compaction machine detects the presence of a sidewall projecting with respect to the contact surface of the ground compaction machine in an area horizontally transverse to a forward travel direction of the ground compaction machine. This may mean that the sidewall projects directly from the contact surface. Thus, the ability to operate the ground compaction machine in the autonomous mode is tied to an extrinsic factor, i.e., detecting the presence of at least one sidewall adjacent to the ground compaction machine. Only the detection of at least one sidewall adjacent to the machine, as seen in the direction of travel, thus enables operation of the machine in autonomous mode. For operation of the ground compaction machine in autonomous mode, the working environment of a trench, or the interior of the trench, is considered comparatively safe because, on the one hand, it is clearly geographically delimited and spatially clearly bounded by at least one, ideally two, opposing sidewalls and, on the other hand, collision risks are minimal. A trench interior may also be monitored comparatively reliably, as described in more detail below. The sidewall detection device thus ensures that the autonomous mode is only permitted by the control unit in this work environment. The sidewall detection device and the control unit communicate with each other for this purpose. It is possible for the sidewall detection device to evaluate one or more measured values itself and signal the presence or absence of at least one sidewall to the control unit. Alternatively or additionally, however, it is also possible for this evaluation to be performed by the control unit itself and/or for the sidewall detection device to be part of the control unit.

In principle, it is possible for the sidewall detection device to be used to detect the presence of a sidewall on at least one of the two sides of the ground compaction machine. In this context, "side" refers to the "right" or "left" side of the ground compaction machine with respect to the current forward direction of travel. A typical trench, however, is usually characterized by the fact that it has two longitudinal sidewalls, which, moreover, usually run essentially parallel to one another in the longitudinal direction and project vertically upward from the bottom of the trench. Therefore, it is also preferred if the autonomous mode is enabled only when the sidewall detection device detects, in an area horizontally transverse to a forward travel direction of the ground compaction machine, the presence of a respective sidewall projecting from the contact surface of the ground compaction machine simultaneously on both sides of the ground compaction machine. In particular, the control unit is preferably configured to allow traveling operation in autonomous mode only if the sidewall detection device detects the presence of a sidewall on both sides simultaneously. Simultaneous detection of sidewalls on the two opposite sides of the ground compaction machine (i.e. "right" and "left") results in even more precise identification of the "trench" working environment, so that the autonomous mode is even more reliably actually only allowed by the control unit when the ground compaction machine is actually in a trench.

During actual operation of the ground compaction machine in autonomous mode, it may happen that during continued travel in one direction of travel, the sidewall detection device suddenly detects the absence of the sidewall on one or both sides, i.e., no longer detects the presence of the sidewall. It is then preferred that, if the ground compaction machine is in the autonomous mode, the control unit stops traveling operation when the sidewall detection device no longer detects the presence of the sidewall projecting from the contact surface of the ground compaction machine. This ensures, for example, that the ground compaction machine, when moving out of a trench via a ramp, does not continue its movement outside the trench in autonomous mode, but then stops, for example (and may then, for example, only be moved further in operator mode).

However, in practical operation of the ground compaction machine in autonomous mode, situations are also conceivable in which interruptions of the sidewall may occur within the trench even though the trench does not end but continues. This may be the case, for example, with branches within the trench. Also, existing recesses in a sidewall, such as branching sewer lines, etc., may result in temporary interruptions in the trench sidewall surface. It is now desirable that the ground compaction machine in autonomous mode does not stop every time such interruptions occur in the surface of a sidewall and thus gets "stuck" in such places. To circumvent this problem, the control unit may have a compensation function, with the aid of which it is possible to continue operation of the ground compaction machine in the autonomous mode even in case of short and transient interruptions of the presence of a sidewall detected by the sidewall detection device. For this purpose, it is possible, for example, that during traveling operation in autonomous mode, in the event of an abrupt loss of detection of the presence of a sidewall by the sidewall detection device, the control unit continues traveling operation in autonomous mode in a time- and/or distance-dependent manner. This means that initially there must be an abrupt loss of detection of the presence of a sidewall. Abrupt thus refers to the loss of detection from one moment to the next. If, for example, a determined lateral distance to a sidewall slowly increases in the direction of travel to a point where no sidewall is detected by the sidewall detection device any longer because, for example, the sidewall slopes ever more flatly to the side or the distance of the sidewall from the sensor used gradually exceeds its detection range, the compensation function is not triggered because such a loss would not occur abruptly. Thus, in terms of distance, abrupt is to be understood in the sense of "within a few centimeters". A time- and/or distance-dependent continuation of traveling operation means that after the abrupt loss of detection of the presence of a sidewall, the ground compaction machine continues traveling operation for a predefined time and/or distance interval (tolerance interval), which may be predefined ex works and/or may be selectable by the operator. If the sidewall detection device detects the presence of a sidewall again within this tolerance interval, for example after the passage of a trench branch, the ground compaction machine remains in autonomous mode and continues its operation. If, on the other hand, the tolerance interval expires without re-detection of the presence of a sidewall (in particular by the respective sensor that previously detected an interruption of the sidewall), the control unit terminates the autonomous mode and the machine stops independently or is even switched off automatically, for example. Additionally or alternatively, it is also possible that, in the event that the presence of a sidewall is abruptly no longer detected by the sidewall detection device, the control unit continues traveling operation in autonomous mode if, and in particular only as long as, the presence of a sidewall is detected elsewhere by the sidewall detection device. Specifically, this may mean that, for example, the autonomous operation of the ground compaction machine continues in the event of an abrupt loss of detection of the presence of a sidewall on one side of the ground compaction machine, for example on the right, if the sidewall detection device continues to detect the presence of a sidewall on the other side, in the present example thus on the left side of the ground compaction machine. Preferably, this may also be limited through a tolerance interval in a distance- and/or time-dependent manner and thus require the re-detection of a sidewall on both sides of the ground compaction machine within a specified time interval and/or a specified distance to avoid stopping of the ground compaction machine in autonomous mode. In addition or as an alternative to the variant of determining the presence of a sidewall on both sides of the ground compaction machine, the sidewall detection device may also detect the presence of a sidewall on at least one side at a plurality of locations located one behind the other and/or one above the other in the direction of travel. The compensation function with the principles described above may be applicable in this case as well. Additionally or alternatively, it is also possible for the control unit to generate a virtual model of the wall and/or the course of the wall by calculation based on the sensor data determined and/or by external specification of corresponding data. Using this virtual model, it is then possible to deduce whether or not a wall interruption is in the range of a "small" or ignorable wall interruption, such as a branch.

However, the compensation function may also be made possible by adapting the sidewall area detected by the sidewall detection device in the forward direction of travel and/or in the vertical direction, for example also by suitably configuring the detection angle of the sidewall detection device. For example, the sidewall detection device may not only detect the sidewall area located in the horizontal plane orthogonal to the direction of travel of the ground compaction machine and thus at the level of the machine, but may also, for example, partially detect a sidewall area still located ahead of the ground compaction machine, looking ahead in the direction of travel. This may be done, for example, by orienting the detection range of one or more sensors obliquely such that the sensor(s) has/have a detection range extending from the ground compaction machine in the direction of the sidewall and forward in the direction of travel, and thus extending forward and obliquely outward. Again, a virtual wall model may be calculated and used as a basis for decision-making.

Various scenarios are possible and preferred in which an automatic stop triggered by the control unit may be provided for the ground compaction machine when in autonomous mode (and moving). For example, traveling operation in autonomous mode may be stopped when the sidewall detection device detects that the vertical height of the detected sidewall falls below a predetermined threshold, in particular as determined from the ground. A particularly preferred wall height, which should not be undercut to maintain the autonomous mode, is at least 30 cm, especially at least 50 cm. Such a threshold may be parameterized and thus manually preset by a user. With this functionality, the sidewall detection device thus not only checks for the actual presence of a sidewall next to the ground compaction machine, but also simultaneously checks for the existence of a predetermined minimum height of the detected sidewall area. In this manner, it can be ensured, for example, that, when driving out of a trench via a ramp, the ground compaction machine stops automatically while still inside the trench. Additionally or alternatively, the ground compaction machine operating in autonomous mode may stop automatically when the horizontal distance of the detected sidewall from the ground compaction machine in a horizontal direction transverse to a forward direction of travel of the ground compaction machine exceeds a predetermined threshold. Such a case may occur, for example, when the ground compaction machine drives out of a trench and/or enters from a trench into a large excavation. Both scenarios are characterized by the trench roller moving from the rather homogeneous and spatially confined environment of a trench interior to a different environment. Here, it is preferred in each case that the control unit of the ground compaction machine then interrupts operation in the autonomous mode, so that movement of the ground compaction machine is then preferably only possible in the operator mode, or that it alternatively reverses in the autonomous mode and the ground compaction machine continues to move in the opposite direction. Finally, additionally or alternatively, a stop of the ground compaction machine operating in autonomous mode may be triggered when the horizontal distance of the detected sidewall in the horizontal direction transverse to a forward direction of travel of the ground compaction machine falls below a predetermined threshold. Said threshold may likewise be parameterized and thus manually preset by an operator. This function may therefore be used in particular to prevent the ground compaction machine operating in autonomous mode from colliding with the sidewall, i.e., to ensure that a minimum or safety distance from the sidewall is always maintained.

In addition to the minimum requirements according to the invention for enabling operation, in particular traveling operation, of the ground compaction machine in autonomous mode by the control unit, further factors may be queried by the control unit in order to permit operation in autonomous mode in the first place. For example, it is preferred that the control unit enables traveling operation in autonomous mode only when the sidewall detection device determines that the vertical height of the detected sidewall exceeds a predetermined threshold (in particular as determined from the ground). A particularly preferred wall height, which should at least be present, is at least 30 cm, in particular at least 50 cm. Such a threshold may also be parameterized and thus manually preset by a user. Here, it is thus ensured that the sidewall currently detected next to the ground compaction machine by the sidewall detection device has a minimum height. The minimum height may, for example, preferably be defined such that, depending on the specific machine, it is at least high enough so that the sidewall cannot be overcome by the ground compaction machine itself. This ensures that the ground compaction machine operating in autonomous mode cannot break out from the trench interior toward the sides. Additionally or alternatively, the control unit may enable traveling operation in the autonomous mode only when the sidewall detection device determines that the horizontal distance of the detected sidewall in the horizontal direction transverse to a forward direction of travel of the ground compaction machine falls below a predetermined threshold or a predetermined maximum distance. This may likewise be defined ex works or preferably manually adjustable. With the aid of this additional limitation, operation in autonomous mode is thus restricted to certain maximum trench widths, which ultimately also ensures that the autonomous mode is actually only enabled by the control unit when the ground compaction machine is positioned in a trench. Additional or alternative limitation of operation in autonomous mode with respect to a minimum trench width is also possible. For example, it may be required that an autonomous operation mode is only possible if the minimum trench width is equal to the maximum machine width plus 10%.

If the ground compaction machine is moving in autonomous mode, measures should ideally be taken to counteract a collision of the machine in autonomous mode. For this purpose, for example, obstacles lying in and/or against the current direction of travel of the ground compaction machine are detected, in particular obstacles that protrude from the ground and/or lie within the vertical height and/or horizontal width of the machine in the direction of travel. Said detecting may be carried out with the aid of an obstacle detection device, for example comprising a distance sensor, a scanner, a camera with suitable image processing software, etc. The control unit may now stop traveling operation in autonomous mode in particular if an obstacle existing in and/or against the driving direction is detected by the obstacle detection device. Independently of the autonomous mode, the obstacle detection device may also be active in the operator mode, at least when the ground compaction machine is in traveling operation, and may, for example, interrupt the travel mode of the ground compaction machine also in the operator mode when an obstacle lying in the travel path is detected.

Ground compaction works require several passes by the ground compaction device to achieve a desired degree of compaction, depending on the desired ground stiffness and the ground material. It is therefore common for ground compaction machines to be operated in a frequently reversing manner, or to travel back and forth several times along a path, with and/or without lateral offset of the individual passing tracks. For this reason, the method according to the invention may also be preferably modified such that, when the ground compaction machine is moving in a direction of travel in autonomous mode, a reversing command, by which the direction of travel is switched to the opposite direction of travel, is automatically generated and controlled by the control unit. It is possible, for example, for a reversing process to be initiated by the control unit if a real obstacle lying in the direction of travel is detected and, preferably, at the same time no obstacle is detected in the direction opposite to the current direction of travel. Such a scenario occurs, for example, when the ground compaction device is heading for a trench wall, such as at the end of a trench. Additionally or alternatively, the ground compaction machine may also encounter a virtual obstacle. In this context, a virtual obstacle refers to an externally or internally specified path limitation, such as may be specified by so-called geofencing applications. It will be appreciated that the ground compaction machine in this case includes a suitable detection device for detecting and evaluating corresponding specifications. In the case of a geofencing application, this means, for example, that a location of the ground compaction machine is determined via a satellite navigation system and/or via a mobile radio system and/or a local positioning system, and this position determination is compared with a specified permissible movement area. Additionally or alternatively, a reversing command may also be initiated by the control unit when the end of a manually specified route has been reached.

As a further addition or alternative, for example, a reversing process and/or other machine functions/reactions may be initiated by the control unit in autonomous mode when an external marking element which can be detected by the ground compaction machine via a detection device is detected. According to this method embodiment, at least one marking is positioned in the terrain which can be detected and evaluated by the ground compaction machine and which represents various functions and/or commands and/or circumstances in a form which can be decoded by the ground compaction machine. A first important aspect in this case is that the ground compaction machine comprises a recognition device by means of which it can recognize and decode the at least one marking positioned in the terrain during traveling. This system, consisting of a recognition device and a marking that can be detected by it, is ideally configured such that automatic and contactless identification of one or more markings is possible during ongoing operation of the ground compaction machine. The at least one marking and the recognition device form a mutually compatible pair of interaction. The marking may be, for example, an optically detectable marking, such as a sign with a numerical and/or color coding, a color marking, also sprayed on the floor or wall, an optoelectronically readable code, such as a QR or bar code, or the like. In this case, the ground compaction machine comprises at least one suitable detection device, such as a camera with suitable image processing software and/or a scanner, etc. The marking may also comprise a non-optical detection principle, for example using RFID technology. The at least one marking is then preferably an RFID transponder and the detection device on the machine side is a suitable transmitter and receiver unit. The external marking element used may be a point marking, in particular with respect to the route, such as an RFID transponder placed in the terrain and/or a marking sign, or an extended marking running along the route.

It is therefore also preferred if a reversing process or a stop of the travel movement of the ground compaction machine is initiated by the control unit when the detection of an external marking element that can be detected by the ground compaction device by means of a detection device is interrupted. Thus, in this embodiment, detection of a marking either continuously or within specified time and/or distance intervals specifies that the ground compaction machine continues its traveling operation. If this detection is interrupted or not continued in time, at least with regard to the specified time and/or distance sections, it is accordingly preferred that the machine then either stops or even initiates a reversing process.

With regard to the specific control sequence when initiating a reversing process of the ground compaction machine in autonomous mode, various alternative procedures are also possible in principle. For example, a reversing process may be initiated in a straight-lined manner in that the ground compaction machine moves back along the identical route in the opposite direction of travel during the initiated reversing process. Alternatively, the ground compaction machine may also initiate a track offset with the initiation of the reversing process such that the movement track of the ground compaction machine in the reverse direction continues laterally offset relative to the movement track of the ground compaction machine in the forward direction by, for example, a predefined amount in horizontal direction and perpendicular to the direction of travel. In this case, the reversing process thus at the same time also comprises a steering movement of the ground compaction machine controlled by the control device.

Additionally or alternatively, it is also possible to record, document and/or display tracks and/or one or more measured values correlating with the ground stiffness, for example at a central station, a remote control, via a web interface, on a smartphone and/or tablet, etc. A display on the machine itself may also be provided.

For the method according to the invention, it is now particularly preferred that for functions initiated and/or performed autonomously by the ground compaction machine or for the ground compaction machine in autonomous mode, a manual operating input received by the ground compaction machine, or ultimately by the control unit, is always hierarchically prioritized over all autonomous functions. In this manner, the manually operated input device provides a general override that ensures that the operator can always override the autonomous mode. In the event that the ground compaction machine is currently in autonomous mode, various variants are now possible as to how a manual input received during this operating state is processed by the control device for controlling the ground compaction machine. For example, it is possible for the control device to implement the actual specific manual operator input. For example, if the operator specifies a steering movement to the left via the manually operated input device during operation of the ground compaction machine in autonomous mode, the control device implements this command and initiates a steering movement of the ground compaction machine to the left. On the other hand, at least as long as the ground compaction machine is operated in autonomous mode, any input made via the manual input device may be interpreted by the machine-side control device as an external stop command, for example with regard to the pure travel movement or also with simultaneous switching off of the drive motor, and may be initiated accordingly. An operator may also give "high-level" instructions when the ground compaction machine is in autonomous mode. More specifically, this may mean, for example, that the operator initiates a track change in which the ground compaction machine operates in a defined manner, for example with tracks lying exactly next to each other or overlapping tracks with a defined overlap width, which is then implemented autonomously by the ground compaction machine. Additionally or alternatively, such a "high-level" instruction may be used to turn laterally into a second trench course branching off from a first trench course or into another trench branching off from a trench. Independently of this, it is also possible in particular that the ground compaction device does not always have to be in signal connection with a manually operable input device, for example a remote control, during operation in autonomous mode. Advantageously, an interruption of a signal connection with a remote control does not lead to an interruption of the operation of the ground compaction machine when in the autonomous mode. For the operator mode, on the other hand, it is advantageous if, in the event of an interruption in the signal connection to a remote control, the ground compaction machine in traveling operation stops automatically as a precaution.

It may be advantageous for the operator of the ground compaction machine, especially when the ground compaction machine is in autonomous mode, to be able to obtain information on the current operating state of the ground compaction machine, ideally essentially independent of location. It is therefore also preferred if the control unit, at least during operation in the autonomous mode and preferably also already when the control unit in the operator mode affirms the existence of the external requirements for enabling the autonomous mode, controls an indicating device which is configured such that it indicates operating information of the ground compaction machine to the operator. Ideally, this is at least partly actual value information or real-time information. Of course, the control unit may thus also transmit the display of this operating information to the indicating device regarding the complete operation of the ground compaction machine, i.e. comprising the autonomous mode and the operator mode. The display of the operating information itself may take place directly on an indicating device on the ground compaction machine itself and/or by transmission of corresponding information by the control unit and a suitable transmission device (preferably wireless, for example via a radio link) to an indicating device positioned externally to the ground compaction machine, such as in the context of a central control station and/or a mobile remote control. Relevant information that may be displayed here preferably relates, for example, to an indication of whether enabling requirements for operation in autonomous mode are fulfilled and/or that enabling requirements for operation in autonomous mode are no longer fulfilled. With the aid of such a display, the operator can thus determine, for example, whether he can switch from operator mode to autonomous mode at all, and/or determine that the ground compaction machine originally in autonomous mode has stopped due to the fact that the enabling requirements are no longer met, for example because a sidewall is no longer detected. Additionally or alternatively, the control unit may control the indicating device to indicate whether the ground compaction machine is currently being operated in autonomous mode and/or operator mode. Additionally or alternatively, the indicating device may further be used by the control unit to indicate whether an active signal transmission connection to a remote control exists and/or no longer exists. It is also possible to display current operating parameters. This relates, for example, to the display of the current travel direction, travel speed, a tank filling state, an activation state of an exciter unit, etc. Additionally or alternatively, data and evaluation results determined with the aid of the sidewall detection device and/or the obstacle recognition device may also be transmitted from the control unit to the indicating device, such as, for example, a current camera image, distance data, in particular in a horizontal direction transverse to the direction of travel of the ground compaction machine, etc. Finally, it is additionally or alternatively also possible to display the current position of the ground compaction machine, for example relative to a remote control usually carried by the operator and/or in a map system, which may be, for example, based on GPS.

With regard to the specific way in which operational information is displayed, various display options, including combinations, may be used depending on the type of information. Optical displays, for example using corresponding signal lamps and/or display screens, such as touchscreens, have proven particularly useful here. However, supplementary or alternative use of acoustic display options is also encompassed, in particular when unexpected events occur, especially events that interrupt the ongoing autonomous mode or at least stop the travel movement of the ground compaction machine in autonomous mode (for example, when hitting an obstacle). Additionally or alternatively, use may also be made of tactilely perceptible indications, such as with the aid of a tactilely perceptible signal device, such as a vibration device, arranged in a remote control, in particular when the operator uses a remote control.

It is also possible that the control unit has a prediction function. The prediction function is characterized by predicting the probable future operating behavior of the ground compaction machine in the autonomous mode in a distance- and/or time-dependent manner. This can be done in particular based on the currently available operating information, in particular with regard to the information determined via the sidewall detection device and/or sensors detecting in the direction of travel to the front and/or to the rear, which provide distance and/or further environment information in and/or against the direction of travel, and/or based on a virtual wall or even environment model. Such a prediction function thus enables, for example, the prediction of the behavior of the ground compaction machine in autonomous mode and corresponding early information of the operator. In this manner, for example, the operator can be informed in a distance- and/or time-dependent manner before actually reaching an obstacle in the travel path and prepare his corresponding reaction. Additionally and/or alternatively, this prediction function also enables, for example, the display of the future travel path of the ground compaction machine, in particular superimposed on a camera image currently recorded by the ground compaction machine. Overall, the forecast function can be used to reduce the potential number of interruptions in autonomous mode, for example.

The method according to the invention may further comprise a planning step in which a traveling plan determined for the ground area to be compacted by the control unit is specified. This movement plan to be followed can enable an efficient and targeted work process. Here, further criteria may be defined, such as overlapping tracks, floor stiffnesses to be achieved, etc. The ground area to be compacted may be specified externally, for example by an operator based on position data, or may be determined by the ground compaction machine itself.

The invention further relates to a self-propelled ground compaction machine, comprising a drive unit via which at least the drive energy required for a traveling operation of the ground compaction machine is provided. The drive unit thus refers to the primary drive unit of the ground compaction machine. This may be, for example, an internal combustion engine or an electric motor. To supply energy to the primary drive unit, the ground compaction machine may carry a fuel tank and/or a storage unit for electrical energy. The actual compaction of the ground takes place with the aid of a ground-contacting device, for example with a drum rolling on the ground or a ground-contacting plate. The ground compaction machine according to the invention further comprises a control unit that controls the traveling operation of the ground compaction machine. The control unit thus refers to a device that transmits corresponding control commands to the individual units of the ground compaction machine that are to be controlled, such as a travel motor, an exciter device, a steering actuator, etc. Such ground compaction machines are known from the literature mentioned at the beginning. Preferably, the ground compaction machine is a vibratory plate or a trench roller.

The ground compaction machine according to the invention further has a sidewall detection device. The latter is configured such that it can detect, in an area in the horizontal direction transverse to a forward direction of travel of the ground compaction machine, the presence of a sidewall projecting in vertical direction relative to the contact surface of the ground compaction machine, in particular projecting vertically from the ground. The "side" of the ground compaction machine is therefore herein defined as the right and left side of the ground compaction machine, viewed horizontally with respect to the direction of travel. Accordingly, a "sidewall" is a wall located on the right or left side of the ground compaction machine so that the ground compaction machine travels along this sidewall in the direction of travel. With the aid of the sidewall detection device, the ground compaction machine or the control unit can check whether there is a sidewall adjacent to the ground compaction machine with respect to the direction of travel of the ground compaction machine in the current position of the ground compaction machine. In other words, the sidewall detection device is configured to detect the presence of at least one sidewall adjacent to the ground compaction machine. Based on this, the control unit is further configured to control traveling operation of the ground compaction machine in an autonomous mode. Alternatively, operation of the ground compaction machine in an operator mode may also be possible. In operator mode, travel specifications are specified by an operator via a manually operated input device of the control unit and are forwarded by the control unit to the unit(s) to be controlled. In autonomous mode, on the other hand, the travel specifications are specified by the control unit itself and forwarded to the unit(s) to be controlled. In autonomous mode, the ground compaction machine thus moves autonomously, or on its own, without requiring active command inputs from an operator. In this case, decisions concerning traveling operation are made by the control unit itself. It is now important to note that the ground compaction machine according to the invention further comprises an enabling device configured to enable or block the autonomous mode. The enabling device, which may be part of the control unit, thus represents a kind of higher-level virtual decision-making entity. The task of the enabling device is to check the presence of defined minimum conditions for operation of the ground compaction machine in the autonomous mode. This ensures that the autonomous mode is basically only possible in an environment of the ground compaction machine explained in more detail below. More specifically, the enabling device is configured such that it enables the autonomous mode only in operating situations in which the sidewall detection device detects the simultaneous presence of at least one sidewall located transversely to the forward direction of the ground compaction machine. This ensures that the ground compaction machine is not arbitrarily operable in autonomous mode, but only in an operating environment in which it is currently adjacent to at least one sidewall, ideally between two opposing sidewalls, such as is the case in a trench.

Generally, it is possible to configure the sidewall detection device such that it checks for the presence of a sidewall on at least one of the two sides of the ground compaction machine. Under certain circumstances, this may already be used as a sufficiently reliable test criterion to the effect that the ground compaction machine is in a trench, for example, to enable the autonomous mode. However, it is preferred if the sidewall detection device is configured such that it detects the presence of one sidewall on each of the two sides of the ground compaction machine, simultaneously or alternately, and ideally the control unit then also uses the simultaneous presence of one sidewall on each of the two sides of the ground compaction machine as a criterion to be met for enabling the autonomous mode. Simultaneous detection means that the presence of a sidewall is detected simultaneously on both sides of the ground compaction machine. Alternating detection, on the other hand, refers to a temporally alternating detection of the presence of a sidewall on both sides of the ground compaction machine, as might be the case with a sensor that pivots or rotates about an axis, such as 2D and 3D lidar sensors. The possible specific configuration of the sidewall detection device will be discussed in more detail below.

It is now advantageous if the sidewall detection device has at least one distance sensor which is arranged on the ground compaction machine such that, with regard to its viewing direction and/or its detection range, it is at least partially oriented obliquely or parallel to the horizontal plane toward the side of the ground compaction machine. This also includes a distance sensor whose viewing direction and/or detection range is horizontal and perpendicular to the direction of travel of the ground compaction machine. The distance sensor arranged on the ground compaction machine thus first of all designates a device which is preferably configured such that, starting from the ground compaction machine itself in a defined direction within a defined range, it can determine the distance from the distance sensor, i.e. starting from the ground compaction machine, to an object lying in the defined direction within the defined range. The direction designates the viewing or detection direction of the distance sensor, so to speak. Starting from the distance sensor, said direction may be, for example, essentially linear, specifically in the form of a measuring beam, among other things, or, for example, essentially conical, fan-shaped, etc. In the case of using a scanning distance sensor, the scanned area is taken as the basis here by definition. The defined range may be specified in particular with regard to the maximum and/or minimum lateral distance in a minimum permissible and/or a maximum permissible distance to the sidewall to be detected. On the one hand, this may be predetermined by the measuring capability of the distance sensor used per se and/or limited ex works or by the operator through a corresponding control specification.

To detect the presence of a sidewall on each side of the ground compaction machine, there are now several options. On the one hand, a distance sensor with a horizontally rotating detection range may be used. In such a case, it is advisable to position the distance sensor on the top side, possibly vertically offset upward relative to the remaining ground compaction machine by means of a suitable support device, such as a support pole. However, with a view to achieving the desired overall compactness of the ground compaction machine while at the same time ensuring reliable sidewall detection, it is preferable for the sidewall detection device to have at least two distance sensors whose detection ranges are each at least partially oriented in the direction of one of the two sides of the ground compaction machine. Thus, at least one separate distance sensor is provided for each of the two sides of the ground compaction machine, so that the detection of the presence of a sidewall on the right and on the left side is carried out via separate distance sensors. This embodiment has the particular advantage that the distance sensor is not structurally exposed vertically, but may be placed on the ground compaction machine at the level of the respective sidewall.

For trouble-free operation of the ground compaction machine in autonomous mode, it is advantageous if the sidewall detection device can obtain the most comprehensive information possible about the presence of the sidewall (s). Therefore, according an embodiment preferred according to the invention, the sidewall detection device has at least two distance sensors on at least one side of the ground compaction machine, which are arranged relative to one another such that their detection ranges, as viewed in a direction of travel of the ground compaction machine, extend at least partially one behind the other. This can be achieved structurally, for example, by corresponding orientation of the detection ranges of the at least two distance sensors and/or their positioning one behind the other in the direction of travel. Additionally or alternatively, the at least two distance sensors may also be arranged relative to each other such that their detection ranges, as viewed in the vertical direction of the ground compaction machine, at least partially extend one above the other. For this purpose, the detection ranges of the at least two distance sensors may again be oriented accordingly and/or they may be positioned one above the other on the ground compaction machine as seen in the vertical direction.

In the event that the ground compaction machine has multiple distance sensors with regard to its detection range, in particular in the direction toward the side of the ground compaction machine, these may generally be based on the same functional principle and even be of identical design. However, it can also be advantageous if the at least two distance sensors carry out a distance measurement in a mutually different manner, so that in this case different functional principles and/or, for example, measuring wavelength ranges (e.g. ultrasound and infrared) and thus also different tasks are combined with one another, in particular even detecting at least the same directions and/or at least partially overlapping spatial ranges. This may increase the potential range of applications of the ground compaction machine according to the invention in that some distance sensors may be more susceptible to certain environmental conditions, such as lighting conditions, a possible dust load in the air, etc., which can ideally be almost compensated for by combining them with distance sensors that operate differently. Specifically, for example, an ultrasonic sensor with a comparatively large detection range may detect a comparatively large area, in particular one that also extends in the vertical direction, and at the same time a 2D LRF sensor is provided that detects an at least partially overlapping area, for example one with a horizontal orientation, which enables comparatively precise wall modeling and thus, for example, detection of wall interruptions.

With regard to the specific configuration of the distance sensor(s) used, a broad spectrum may be used. For example, it is possible to use a mechanical or tactile distance sensor, e.g. a distance measuring arm, which can be deflected relative to the ground compaction machine, or the like. The principle here is based on the fact that the mechanical distance sensor has a sidewall-contacting element which is mounted on the ground compaction machine so that it can move relative to it and slides along the sidewall during traveling operation. In this case, the sidewall thus exerts a displacement pressure on the sidewall-contacting element relative to the rest of the ground compaction machine and/or triggers a displacement movement of the sidewall-contacting element relative to the rest of the ground compaction machine. This displacement pressure and/or this displacement movement can then be determined, for example, via a position sensor, displacement sensor/displacement transducer, etc. This can be interpreted by the sidewall detection device as confirmation of the presence of a sidewall. However, use of a distance sensor configured for contactless determination of a distance to a sidewall is preferred. These sensors determine the distance between the sensor and the measured object, in this case the sidewall, in a contactless manner, i.e., without physical contact. In particular, these may be laser sensors, ultrasonic sensors, radar sensors, lidar sensors or one or more cameras, for example a stereo vision camera or 3D camera, with suitable image processing software, the use of structured light, etc., for contactless distance determination. In particular, the control unit may also comprise a device for evaluating image data and in this way identify, for example, the image of a trench wall taken via a camera based on color and/or contrast and/or structure information. Such information characteristic of a trench wall may be dependent on the ground material, moisture, composition of the ground material, etc., and may be used for actual computational identification of a trench wall from a captured image by the control unit.

The task of the sidewall detection device described above is essentially to ensure that in the autonomous mode the ground compaction machine is positioned close to at least one sidewall and ideally between two sidewalls extending in the direction of travel. For the actual traveling operation of the ground compaction machine in autonomous mode, however, it is advantageous if there is additionally at least one sensor which is configured to detect an area lying in front of and/or behind the ground compaction machine in the direction of travel, in particular an area in the travel path of the ground compaction machine. This sensor is thus part of a travel path detection device or obstacle detection device whose task is to detect and evaluate the travel path of the ground compaction machine and to detect potential obstacles located in the travel path, for example, in order to avoid a collision of the ground compaction machine with an obstacle. This may be, for example, a person in the trench, etc. With regard to the specific configuration of the sensor, reference may be made to the above explanations regarding the sidewall detection device. For example, suitable distance sensors and/or camera systems have also proved particularly useful here. In addition to the possibility of the vertically exposed arrangement of a suitable sensor already described above, it is also possible here to orient the at least one sensor used with its detection range at least partially to the front or to the rear in the direction of travel and, in particular, to place it at the front and/or the rear of the ground compaction machine. It is preferred if the respective sensor used is oriented with its detection range such that it detects at least part of the ground located in the travel path ahead of the ground compaction machine. Additionally or alternatively, it is advantageous if the at least one sensor oriented in the direction of travel has a smaller opening angle than the at least one sensor oriented toward the right or left side.

The at least one sensor of the obstacle detection device and the at least one sensor of the sidewall detection device are a common sensor or two or more separate sensors, which are preferably positioned such that their detection ranges overlap each other. This offers the advantage that statements regarding the travel path and/or the sidewall can be checked redundantly and thus be made more reliably. The detection ranges of the respective sensors can even be oriented relative to each other such that a total detection range is obtained that surrounds the ground compaction machine, in particular at the level of the ground compaction machine. Additionally or alternatively, a virtual bird's eye view may be generated using suitable software, especially if one or more cameras are used.

As already discussed with regard to the method according to the invention, according to a preferred embodiment of the invention, the ground compaction machine is configured such that it independently detects and evaluates external and/or virtual markings in autonomous mode and is controlled accordingly by the control unit. In terms of the device, it is therefore preferred if the ground compaction machine comprises a device for, ideally contactless, detection of at least one external and/or virtual marking With regard to the possible specific configuration of the external and/or virtual marking, reference is made to the above explanations of the method according to the invention. A particularly suitable detection device may be, for example, a camera, an RFID scanner, an optical scanner, etc.

Further, an indicating device for indicating at least one or more of the following operating parameters, in particular as parts of a remote control and/or control station, may be part of the ground compaction machine according to the invention:

- autonomous mode is switched on and/or off; (the same applies to operator mode)
- autonomous mode is active and/or inactive
- autonomous mode is available and/or not available
- the presence of a sidewall is currently being detected and/or not being detected
- at least one currently determined distance to a sidewall detected by the sidewall detection device (both sides, etc.)
- an obstacle existing in the direction of travel in front of and/or behind the ground compaction machine is detected and/or not detected
- there is an active and/or inactive signal connection to a remote control.

In the event that the indicating device is arranged directly on the ground compaction machine and travels together with it, use may be made, for example, of corresponding indicator lights/signals, etc. In addition to an optical display, acoustic signaling, for example by means of a siren and/or horn, is also possible. In the case of a remote control and/or a control station, the ground compaction machine communicates with the remote control via a suitable, preferably wireless, signal transmission connection, preferably permanently or at least intermittently, and transmits the corresponding aforementioned information to it. Additionally or alternatively, this may be done upon request by an operator. In particular for the "remote control" case, the autonomous mode may be aborted when there is no longer an existing signal transmission connection between the ground compaction machine and the remote control (or at least in one of the two directions). For the specific configuration, the system known from DE102010014902A1 may be used, for example, with the modification that the ground compaction machine is at least stopped or the control unit enforces abortion the autonomous mode if the signal connection between the remote control and the ground compaction machine is interrupted. The latter has the consequence that the resumption of a signal connection between the remote control and the ground compaction machine does not lead to the continuation of the traveling operation of the ground compaction machine in the autonomous mode, but the latter must first be initiated again by the operator via the remote control starting from the operator mode. However, it is also possible to configure the control unit such that an existing signal connection between the remote control and the ground compaction machine is only required for the operator mode, whereas when the ground compaction machine is operated in the autonomous mode, an essentially standing signal transmission connection from the remote control to the ground compaction machine is not required.

One or more devices for detecting a person and/or indicating that a person has been detected may further be provided on the ground compaction machine.

The ground compaction machine according to the invention is preferably a trench roller or a vibratory plate, particularly preferably with a remote control in each case. For the trench roller, it is particularly preferred if it is articulated and accordingly has a front frame and rear frame connected to each other via an articulated joint. It is then further advantageous if the sidewall detection device is configured such that a distance sensor for detecting the presence of a sidewall is provided at least on one side of the trench roller in each case on the front carriage and on the rear carriage. For the vibratory plate, on the other hand, it is advantageous that it has a distance sensor on each side, i.e. on the right and left side as well as on the front and rear side. However, it may be advantageous if at least two sensors are provided for determining the distance to the right and left sides with respect to the direction of travel.

Finally, another aspect of the invention consists in a system comprising a ground compaction machine according to the invention and a mobile remote control, wherein the ground compaction machine is manually remotely controllable via the mobile remote control. The essential aspect of this inventive idea is that the ground compaction machine is preferably configured to transmit information to the remote controller at least in the autonomous mode, as described above. Accordingly, reference is made to the aforementioned explanations.

Finally, the ground compaction machine according to the invention and the system comprising a ground compaction machine according to the invention and a remote control are particularly preferably configured for carrying out the method according to the invention with its preferred embodiments.

BRIEF DESCRIPTION OF THE DRAWINGS

The invention will be explained in more detail below by reference to the embodiment examples shown in the figures. In the schematic figures.

DETAILED DESCRIPTION

Figure 1A:
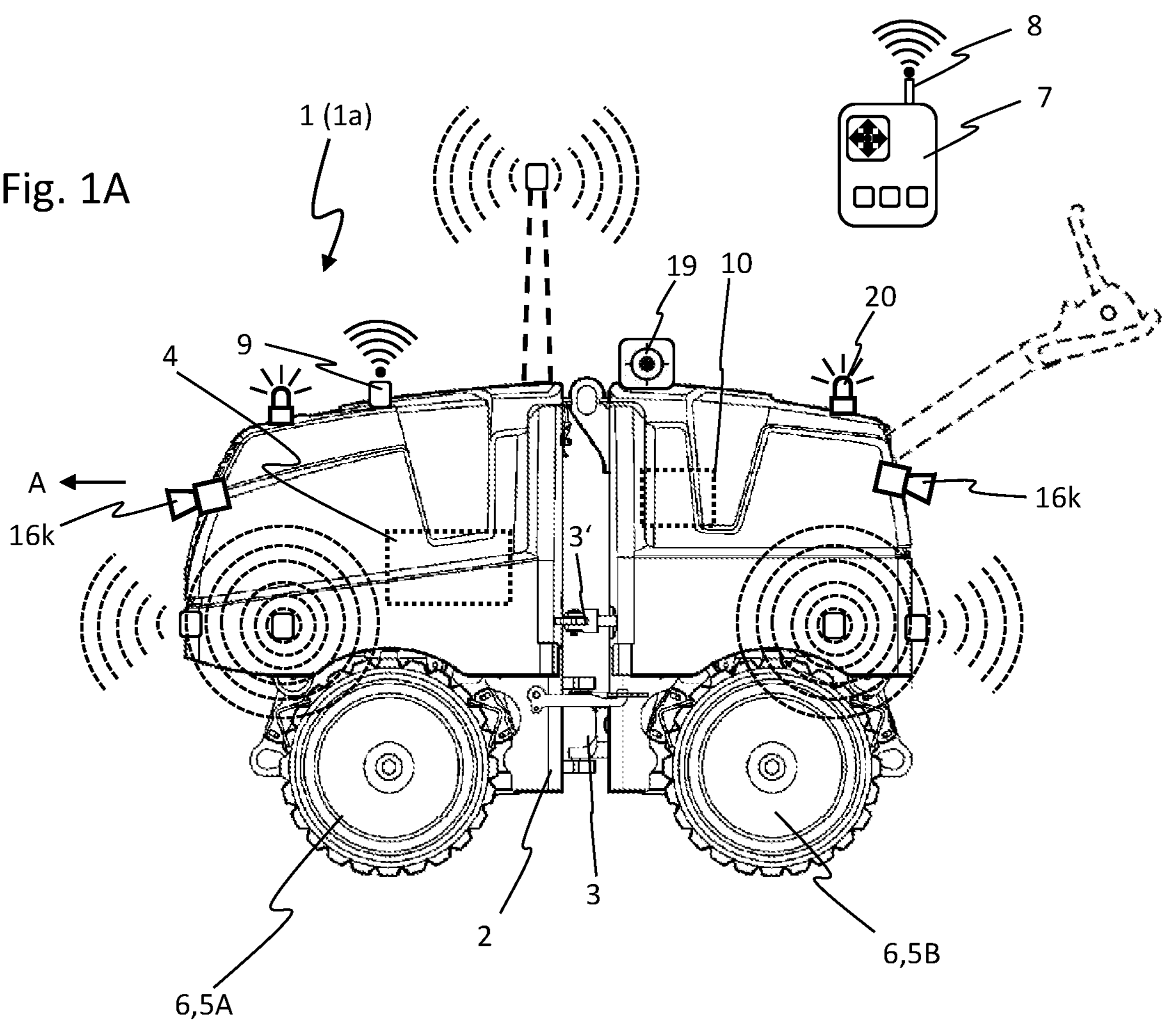
FIG. 1A: shows a side view of a ground compaction machine of the trench roller type.

Structurally or functionally like components may be designated with the same reference numeral in the figures. However, not every component or process step repeated in the figures is necessarily designated separately in each figure.

Figure 1B:
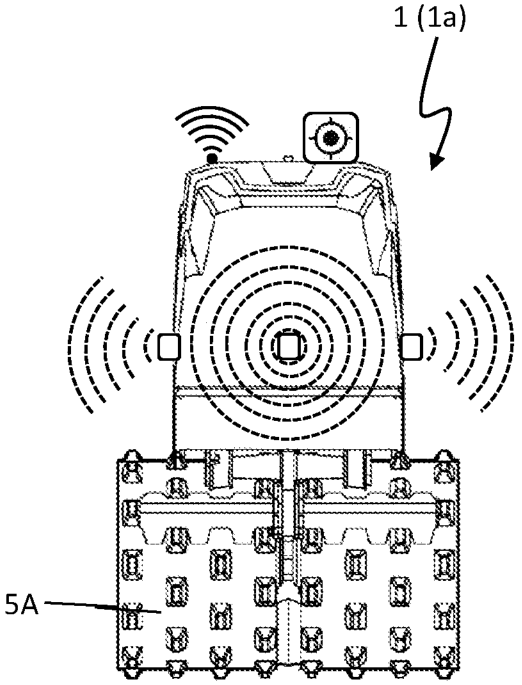
FIG. 1B: shows a front view of the trench roller of FIG. 1A.

FIGS. 1A and 1B show a ground compaction machine 1 of the trench roller 1A type. In this case, essential elements of the ground compaction machine 1 are a machine frame 2 with, for example, a front frame 2A and a rear frame 2B, which may be connected to each other by an articulated joint 3. The ground compaction machine 1 comprises a primary drive unit 4, for example an internal combustion engine or electric motor, via which the drive energy required for traveling operation of the ground compaction machine 1 is provided. The ground is compacted by means of the compaction drums 5 rolling on the ground, which accordingly represent the ground-contacting elements 6. One or more traction drive motors, in particular electric or hydraulic motors, may be provided to drive the compaction drums 5. For manual operation of the ground compaction machine 1, a device for manual input of control commands may be provided on the ground compaction machine 1 directly (as indicated in FIG. 1A by the steering drawbar arranged in phantom lines) or a remote control 7. In this case, the remote control 7 comprises at least one transmitter 8 and the ground compaction machine 1 comprises a receiver 9.

The ground compaction machine 1 further comprises a control unit 10 which controls the operation of, inter alia, the primary drive unit 4 of the travel drive, in particular the at least one travel drive motor, and, in the present embodiment example, a steering actuator 3' of the articulated joint 3. However, it is also possible to configure the trench roller without articulated steering and steering actuator with a continuous rigid frame. In this case, steering is performed by coordinating the travel movement of the front and rear pairs of drums ("tank steering"). Furthermore, the control unit 10 receives the operating commands entered via the remote control 7 and/or a manually operated input device arranged directly on the ground compaction machine 1 and converts them into corresponding control commands or travel control signals within the ground compaction machine 1.

Figure 2A:
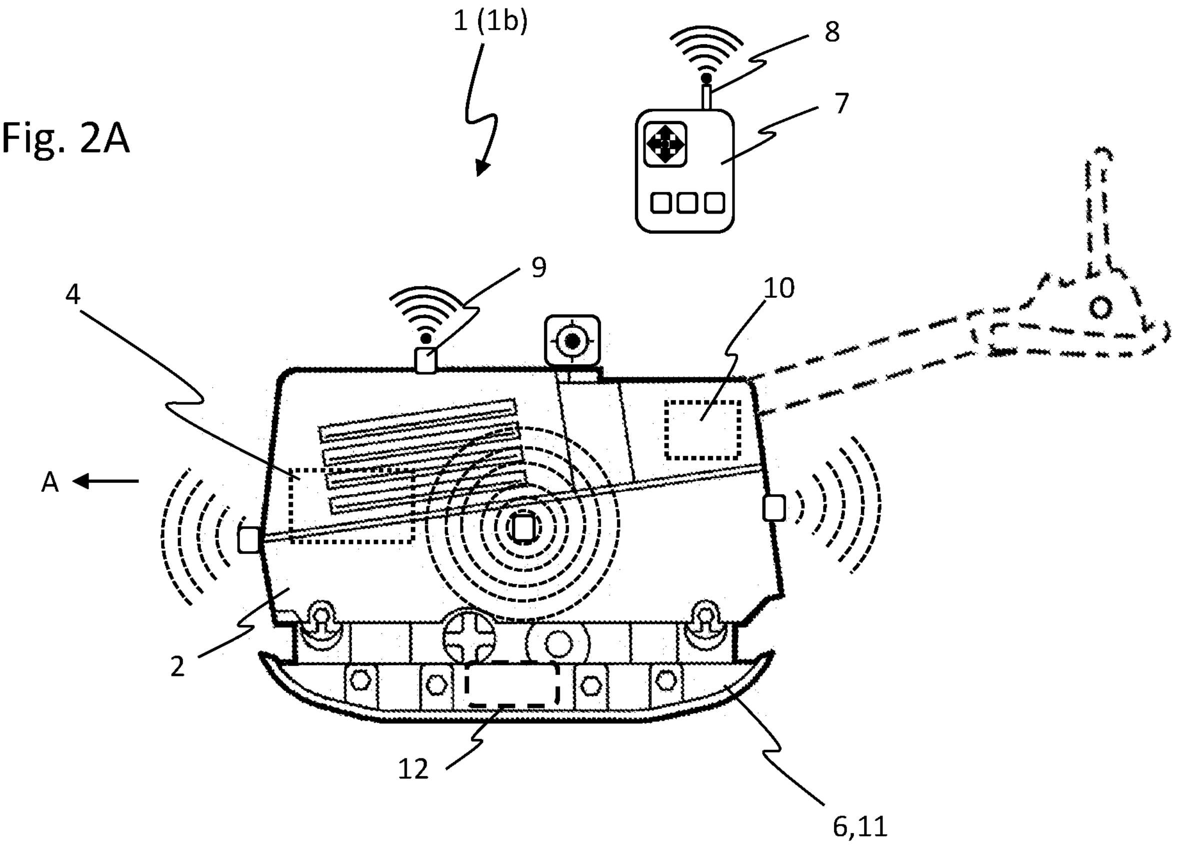
FIG. 2A: shows a side view of a ground compaction machine of the vibratory plate type.
Figure 2B:
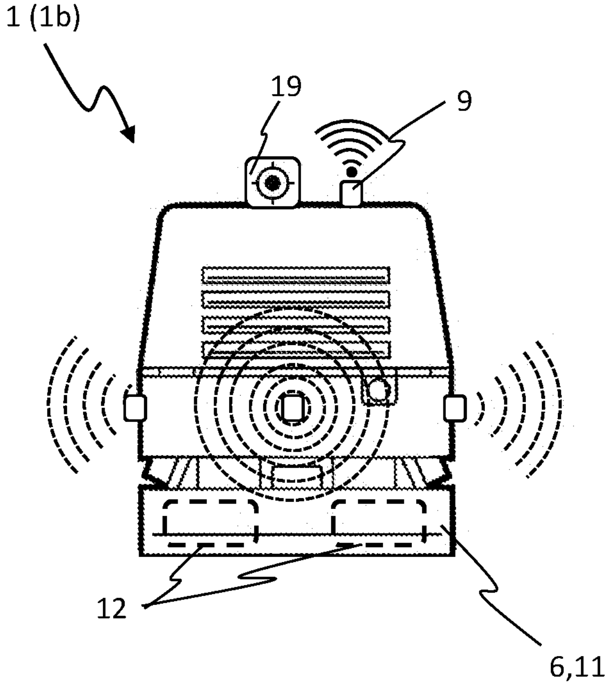
FIG. 2B: shows a front view of the vibratory plate of FIG. 2A.

FIGS. 1A and 2B show a ground compaction machine 1 of the vibratory plate 1B type. Essentially, reference is made to the corresponding explanations of FIGS. 1A and 1B for a description of the individual components. In contrast to the trench roller 1A, the vibratory plate 1B has a vibrating plate 11 as the ground-contacting element 6. Thus, locomotion of the vibratory plate 1B is achieved via one or more imbalance exciters 12 in a manner known per se.

An operator mode and an autonomous mode are provided for operation of the ground compaction machine 1. In the operator mode, the working operation, in particular the driving, steering and/or exciter operation, is controlled by an operator via the manual input of corresponding operating specifications, for example via a manually operated input device arranged on the ground compaction machine 1 or a remote control. Operation of the ground compaction machine 1 in autonomous mode, on the other hand, is only possible under certain conditions. In particular, this may include the requirement of detecting the presence of at least one sidewall adjacent to the ground compaction machine 1, as further explained below by way of example. For this reason, the ground compaction machine 1 also includes a sidewall detection device 13, the basic structure of which is first explained in more detail using FIG. 3 as an example. In autonomous mode, the ground compaction machine 1 or the control unit 10 generates operating instructions itself, i.e., makes decisions regarding driving and/or steering commands itself. In this mode, it thus moves autonomously or automatically and not based on individual, manually entered travel and/or steering specifications.

Figure 3:
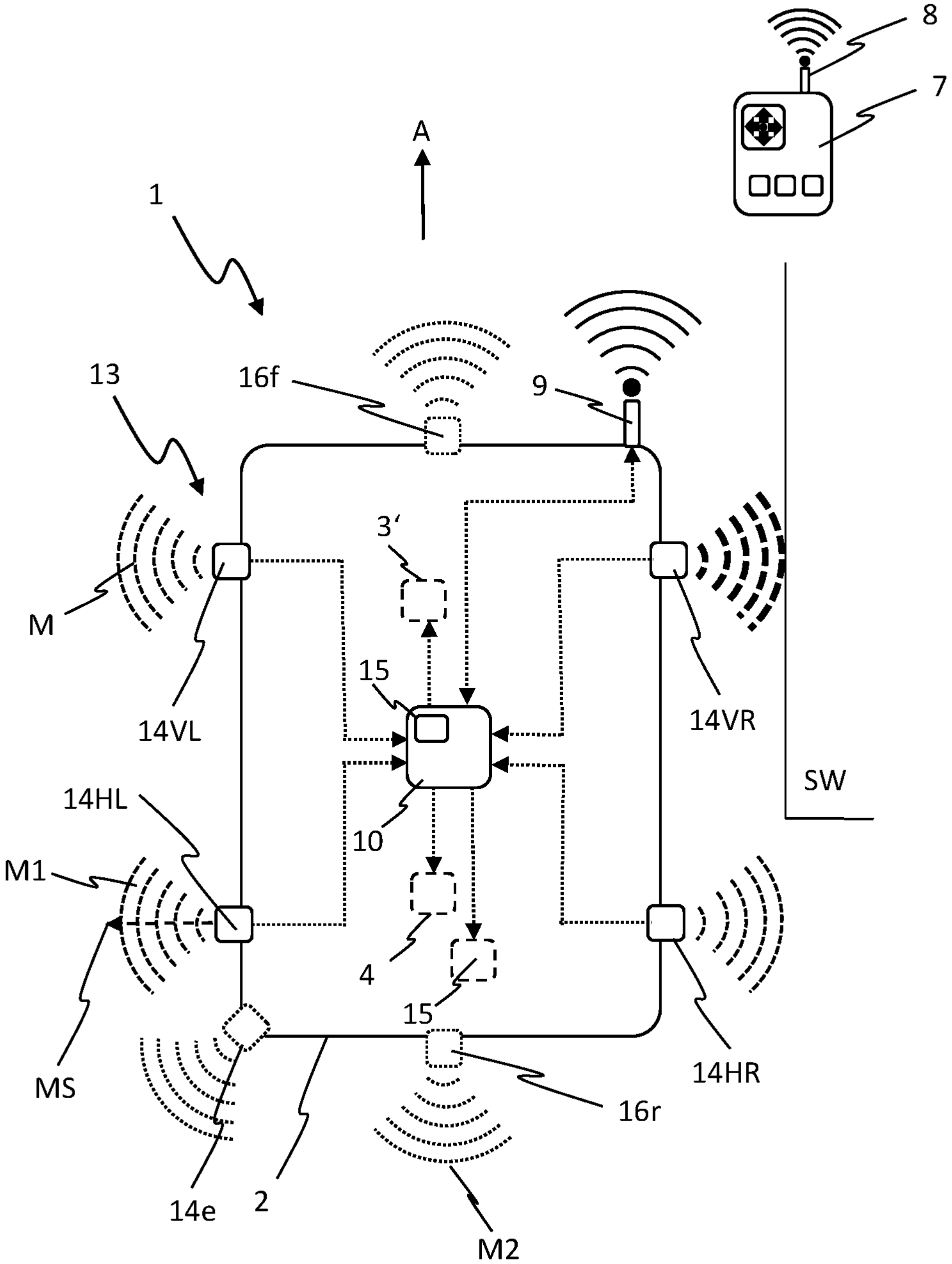
FIG. 3: shows a schematic top view of a ground compaction machine with various sensor arrangement alternatives.

FIG. 3 shows a schematic top view of the ground compaction machine 1. The sidewall detection device 13 comprises at least one device configured to detect a sidewall SW projecting relative to the ground on which the ground compacting machine 1 is standing, next to the ground compacting machine 1 as viewed in the direction of travel A. From a functional point of view, the task and function of the sidewall detection device 3 is thus to check whether a sidewall SW is currently located next to the ground compaction machine 1, in particular for enabling the autonomous mode and/or during traveling operation in the autonomous mode. "Adjacent/next to" in this context refers to a space located vertically above the contact surface of the ground compaction machine and in the horizontal plane perpendicular to the direction of travel, in particular at least partially at the level of the ground compaction machine. The direction of travel A denotes the current direction of travel of the ground compaction machine 1, which in this case comprises a forward direction of travel and an opposite reverse direction. These can be defined essentially arbitrarily on the respective ground compaction machine 1. In the figures, the forward direction is indicated as direction of travel A by way of example. The sidewall(s) SW that is/are relevant in the present case is/are thus located in the horizontal plane perpendicularly to the right and/or to the left relative to the forward direction of travel A. For the detection of at least one sidewall located next to the machine, one or more suitable sensors 14 may be provided on the ground compacting machine 1. In the present embodiment example according to FIG. 3, the sidewall detection device 13 comprises a total of four individual sensors 14VL (front left), 14HL (rear left), 14VR (front right) and 14HR (rear right). The number of sensors per side is variable within the scope of the invention. For example, one sensor on each side may be sufficient. The sensor or sensors 14 transmit their measured values to an enabling device 15, which may be a module that is structurally and functionally separate from the control unit 10 or, as in the present embodiment, an element integrated into the control unit 10. The enabling device 15 checks whether one or more of the sensors 14 detect the presence of a sidewall. Each sensor comprises a measuring range M1 for this purpose. The measuring range designates the space within which the respective sensor can determine a distance. This space usually has, for example, a maximum and/or a minimum distance from the respective sensor. In FIG. 3, for reasons of clarity, only the individual measuring ranges of sensors 14VL and 14HL are designated as examples. Usually, and independently of the present embodiments, a measuring range will be defined in advance for each sensor (for example by software) within which it is to perform a distance determination. This measuring range is preferably smaller than the theoretically maximum possible measuring range of the respective sensor.

An actual detection of a sidewall SW is illustrated in more detail in FIG. 3 with sensor 14VR. Sensors that currently detect the presence of a sidewall (or object) within their measurement range M are highlighted in thick print in this and the following figures. This is illustrated in FIG. 3 on the right-hand side with the exemplary sidewall SW. The sensor 14VR encounters the sidewall SW and transmits this accordingly to the enabling device 15 of the control unit 10. The other sensors 14HR, 14VL and 14HL, on the other hand, do not currently encounter any sidewall in the area of their measuring range in FIG. 3. In this case, the enabling device 15 may now be configured such that it blocks the enabling of the autonomous mode because, with respect to the maximum possible lateral detection range on one side, only some of the sensors detecting toward this side detect a sidewall SW. If, in this case, the operator wishes to put the ground compaction machine 1 into autonomous mode, this is blocked accordingly by the enabling device 15. In this case, the enabling device 15 is thus configured such that, in order to enable the autonomous mode, all of the sensors 14 detecting on one side of the machine must simultaneously detect the presence of a sidewall SW. However, it is also possible for the enabling device 15 to enable the autonomous mode already in the case shown in FIG. 3. Then, the enabling device 15 for enabling the autonomous mode is thus configured such that at least one of the laterally detecting sensors currently detects the presence of a sidewall SW. According to a modification of this basic approach, it is also possible that the simultaneous detection of one sidewall on each side of the ground compaction machine by at least one, preferably several, sensors, or the detection of the presence of a sidewall by all sensors 14 is required to enable the autonomous mode. If more than two sensors for sidewall detection are provided on one side of the ground compaction machine, it is also possible for the enabling device 15 to enable the autonomous mode only when at least two (or more) but not all sensors provided on that side simultaneously detect the presence of a sidewall adjacent to the ground compaction machine.

Regardless of the specific embodiment example, it is thus preferred if the enabling device 15 is a hierarchically superordinate entity to the (further) control functions of the control unit 10, which enables or blocks the autonomous mode depending on the result detected via the sidewall detection device 13 (i.e. depending on whether the presence of at least one sidewall next to the ground compaction machine is currently confirmed or not).

The control unit 10 controls the primary drive unit 4 and other elements 3, in particular work and control devices, such as the operation of one or more imbalance exciters and/or the steering factor 3' (if present). The enabling device 15 may further be in communication with the manually operated input device, either via a cable connection as shown in FIG. 3, or wirelessly via the receiver 9 with a remote control 7, or to an input device located directly on the ground compaction machine 1. Furthermore, the receiver 9 may also be configured as a transmitting and receiving unit unit, so that the enabling device 15 and/or the control unit 10 can transmit data to the remote control. Data transmission to an indicating device 15 is also possible. The latter may be located on the ground compaction machine 1 and/or on the remote control 7.

In addition to the at least one sensor 14 of the sidewall detection device 13, the ground compaction machine 1 may further comprise one or more obstacle sensors 16, which are at least partially oriented with their respective detection range M2 in and against the direction of travel A. The detection range M2 of this at least one obstacle sensor 16 (in FIG. 3 obstacle sensor 16*f* to the front and 16*r* to the rear) thus comprises a spatial area starting from the ground compacting machine 1 and extending in front of or behind the machine in or against the direction of travel A of the machine. It is optimal if the detection range M2 of these sensors in particular runs in or against the direction of travel, starting from the ground compaction machine 1, at least partially also in vertical direction downward and sloping to the ground. With the aid of the at least one obstacle sensor 16, it is thus possible to detect obstacles extending vertically downward and/or upward in the travel path A of the ground compacting machine 1 relative to the current contact surface of the ground compacting machine, such as, for example, an object lying in the travel path, a person, a pit, etc. In addition to protecting persons in the vicinity of the machine, the obstacle sensor 16 may in particular also be used, for example, to determine the end of a trench based on the trench wall located in the travel path in front of the machine and, as described in more detail below, to stop or also reverse the machine in autonomous mode.

It is also possible to arrange the sensor(s) 14, 16 such that it/they is/are oriented with its/their detection range M1/M2 both in the direction of the sidewall SW, or toward the side of the ground compaction machine 1, and in or against the direction of travel A, as exemplified in FIG. 3 with sensor 14*e* placed at a corner of the machine 1. It will be appreciated that such positioning may be provided at multiple and in particular all transition areas between the side areas and the front or rear area of the machine 1 with respect to the direction of travel A. Depending on the detection range, such a sensor may act both as an obstacle sensor of the obstacle detection device 17 and as a sensor of the sidewall detection device 13.

With regard to the configuration of the detection range M of the sensor or sensors 14 of the sidewall detection device 13 and the obstacle detection device 17 with the obstacle sensors 16 and their relative orientation to each other, there are also various alternative possibilities. Generally, it is possible to arrange the sensors such that their individual detection ranges are essentially free of overlap with each other, as indicated for example in FIG. 3. This may be the case in particular if the detection range of the respective sensor is not conical, fan-shaped or spherical, but essentially beam-shaped, as indicated by way of example in FIG. 3 for sensor 14HL with the measuring beam MS.

Figure 4A:
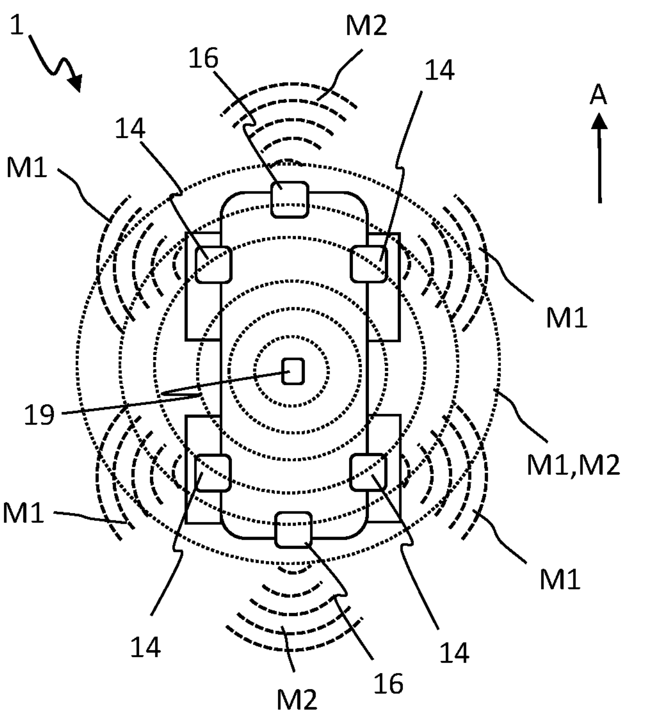
FIG. 4A: shows a schematic top view of a ground compaction machine with various arrangement alternatives for sensor detection ranges.

However, it may also be advantageous if the measuring ranges of the respective sensors at least partially overlap each other. This is illustrated in more detail by way of example in FIGS. 4A and 4B. In FIG. 4A, for example, the ground compaction machine comprises sensors 14 and 16, as described in more detail above with respect to FIG. 3. Each of the sensors 14 of the sidewall detection device 13 has a detection range M1 (which may also vary among themselves). The detection ranges of the obstacle sensors 16 are marked M2. For example, the detection ranges M1, M2 may be cone-shaped, as shown in FIG. 4A. Additionally or alternatively, there may be at least one sensor 14*z* arranged within the outer edges of the machine with respect to the horizontal extent of the machine, in particular arranged essentially centrally with respect to the outer edge of the machine in the horizontal plane, the detection range of which is designated "M1,M2". Such an arrangement may be made, for example, by positioning this sensor 14*z* on the upper side of the machine outer skin or on a pole projecting in the vertical direction. Such a sensor 14*z* may be configured to scan and/or rotate its detection range about a vertical axis. The sensor 14*z* is now preferably arranged such that its detection range M1,M2 can be used simultaneously for sidewall detection and for obstacle recognition. This may be a 3D lidar sensor, for example. In the present embodiment example, the sensor 14*z* is provided supplementary to the sensors 14 and/or 16. For this purpose, it may be optimal if the detection range M1,M2 of the sensor 14*z* at least partially overlaps with one or more or all of the detection ranges M1, M2 of the sidewall detection device 13 and/or the obstacle detection device 17. In other words, the sensors 14*z* and 14 and/or 16 are then arranged such that with the detection ranges M1 (sensors 14) and M2 (sensors 16) and M1,M2 (sensor 14*z*) at least partially identical spatial sections are detected or covered. This may be advantageous in many ways. On the one hand, this creates redundancy, which increases the operational reliability of the ground compaction machine 1, especially in autonomous mode. On the other hand, this enables more reliable and precise detection of one or more sidewalls and/or obstacles, since two different viewing angles can be used for one and the same spatial area via two sensors.

The sensor 14*z* could also be used autonomously, or on its own, for both obstacle monitoring and sidewall recognition and thus, in an extreme case exclusively, simultaneously constitute the sensor for the sidewall detection device 13 and the obstacle detection device 17. It is also possible to use a plurality of such sensors 14*z* for sidewall recognition and/or obstacle recognition. For a trench roller in particular, it may be optimal if one such sensor is positioned in the region of the front half of the machine in the direction of travel and another such sensor is positioned in the region of the rear half of the machine. In particular for an articulated trench roller, it is thus preferred if one such sensor 14*z* is arranged on the front carriage and another such sensor 14*z* is arranged on the rear carriage.

Figure 4B:
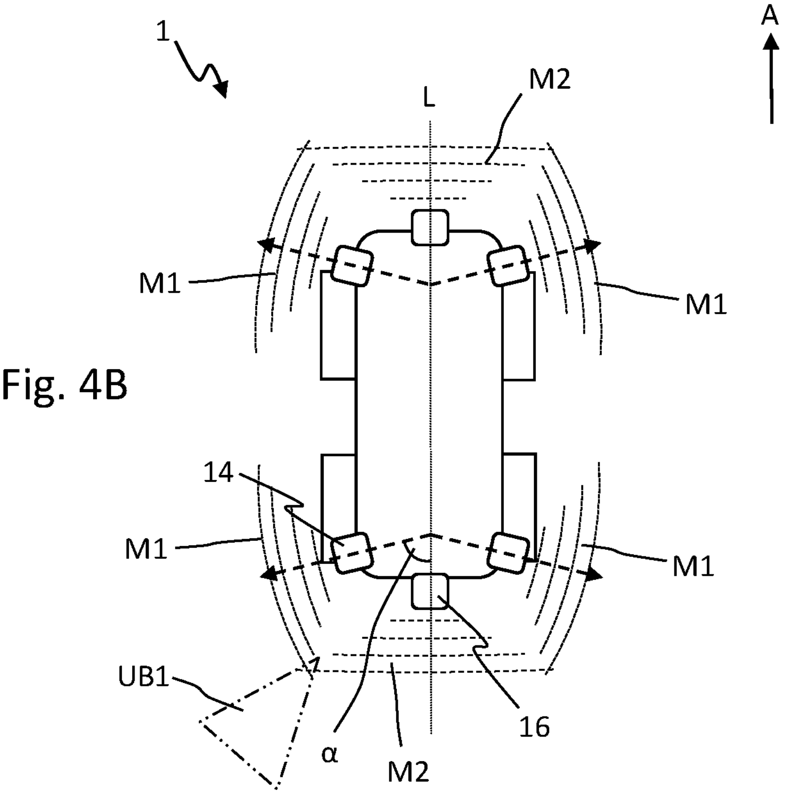
FIG. 4B: shows a schematic top view of a ground compaction machine with various further arrangement alternatives for sensor detection ranges.

FIG. 4B illustrates another possible example of at least partially overlapping sensor ranges. It can be seen from FIG. 4B that the sensors 14 of the sidewall detection device 13 are not positioned in the horizontal plane perpendicular to the direction of travel A, but may be inclined by an angle α with respect to their respective detection range M1 in and against the direction of travel A. This angle is defined in the horizontal plane by the direction of travel A and the center axis of the respective detection range M1 originating from the respective sensor 14 (indicated in each case by dashed arrows in FIG. 4B). For example, the tilting in the horizontal plane is specifically such that the center axis in the horizontal plane is inclined in each case toward the end of the machine closer to the respective sensor as seen in the longitudinal direction of the ground compaction machine. Sensors 14 adjacent to one another on one side of the machine 1 may have detection ranges M1 that are substantially free of overlap with one another or that overlap with one another. However, this arrangement also makes it possible, in particular, to obtain overlapping of the detection ranges of at least one sensor 14 of the sidewall detection device 13 and at least one sensor 16 of the obstacle detection device. Such an overlap area UB1 is highlighted in FIG. 4B as an example for an area located at the rear left with respect to the direction of travel A with a dash-dotted border. It will be appreciated that this is merely for schematic illustration of this principle of arrangement and is not to be understood to mean that the detection range or ranges of the sensors 14/16 necessarily end abruptly, for example. Due to the inclination of the detection ranges M1 of the sensors 14, it is possible, for example, to optimally detect the corner regions of the machine environment, which may be particularly advantageous, for example, for an exact sidewall detection. It may be optimal if all four corner regions (in relation to a horizontal plane) are captured. Due to the preferred arrangement of the sensors of the sidewall detection device 13 and the obstacle detection device 17 in the present embodiment, which is mirror-symmetrical with respect to the longitudinal machine axis L extending in the direction of travel A, this is achieved, for example, with an arrangement as indicated in FIG. 4B.

Figure 5:
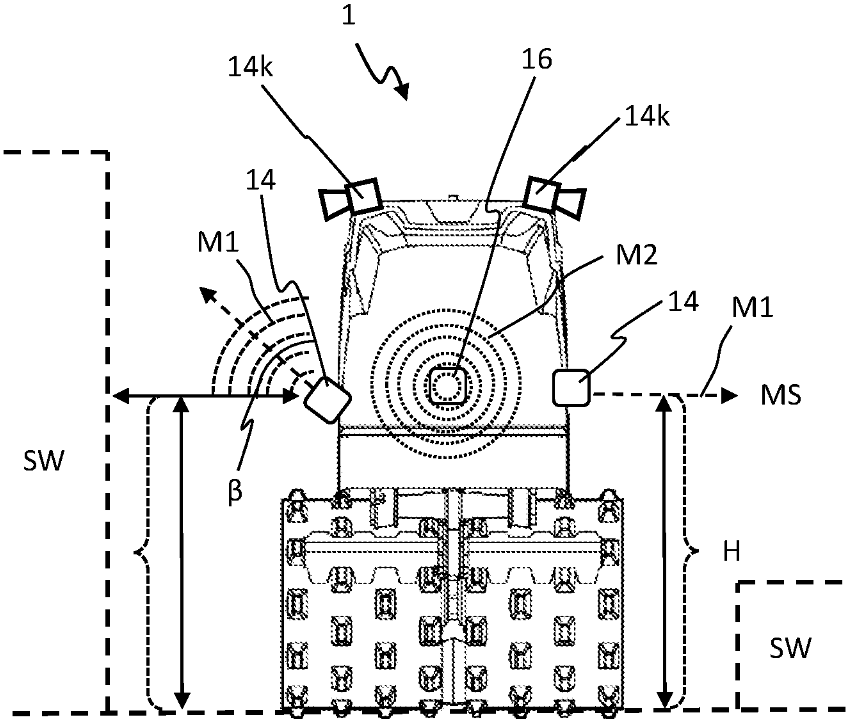
FIG. 5: shows a front view of a ground compaction machine inside a trench.
Figure 6:
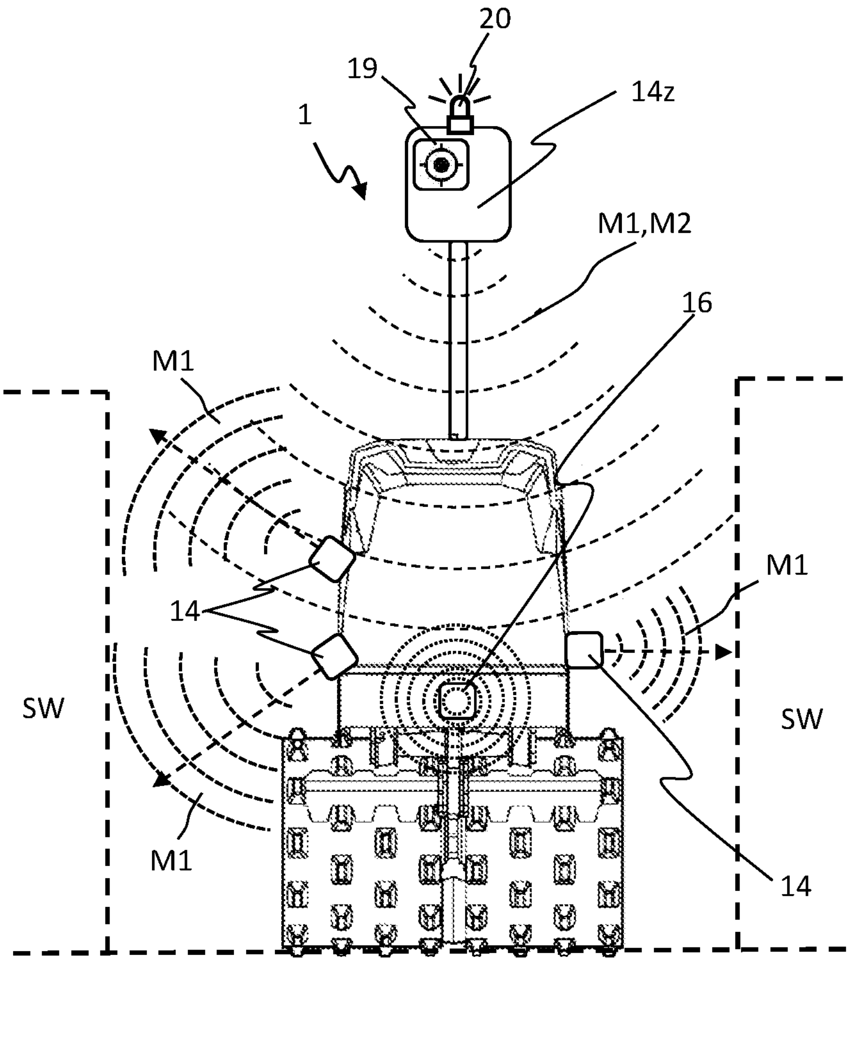
FIG. 6: shows a front view of a ground compaction machine inside a trench.

FIGS. 5 and 6 now illustrate further possible arrangement details with respect to a vertically extending reference plane. In both views, the direction of travel A is, by definition, out of the image plane and toward the viewer. Even though a trench roller is given in the figures as an example of a ground compaction machine 1, the following information in particular also applies in the same way to a ground compaction machine configured as a vibratory plate.

FIG. 5 illustrates two possible arrangements of the sensor (s) 14 with respect to the orientation of the detection range(s) in the vertical plane. On the right, for example, a horizontally running measuring beam MS is indicated. The latter extends at a vertical distance H from the ground. Due to this arrangement, the detectable sidewall SW thus requires a minimum height corresponding essentially to H. If the sidewall SW is lower than H, it cannot be detected. This is shown in FIG. 5 with the sidewall SW on the right. This sidewall has a height from the ground that is less than H. In this case, this variant of the sidewall detection device 13 would thus fail to detect the presence of a sidewall SW and accordingly allow enabling of the autonomous mode. In this case, detectable sidewalls SW must therefore have a minimum height (as seen from the ground) corresponding to the height H.

On the left side, on the other hand, a sensor 14 of the sidewall detection device 13 is shown which has an essentially cone-shaped detection range. The axis (dashed arrow in M1) of the detection cone is inclined vertically upward from the sensor 14 (by an angle (3 with respect to the horizontal). Such angling may be done, for example, such that the lower edge of the detection range M1 or the upper edge of the detection range M1 is essentially horizontal. In this manner, on the one hand, a "minimum height" of the detectable sidewall SW may again be determined by design or, on the other hand, an upward and/or downward "viewing direction" of the respective sensor may be achieved in a targeted manner. This may be advantageous depending on the positioning of the respective sensor 14 on the machine. Of course, a corresponding orientation may also be directed downward, i.e. obliquely toward the ground.

FIG. 6 illustrates further alternatives with respect to the orientations of the sensors of the sidewall detection device 13. The sensor 14 on the right side, for example, is positioned on the machine side such that its detection range M1 extends essentially horizontally with its longitudinal center axis. On the left side, on the other hand, a pair of sensors with two sensors 14 arranged one above the other in the vertical direction is shown. It is also possible to position more than two sensors one above the other in the vertical direction. Further, the sensors 14 arranged one above the other may also be positioned overlapping or without overlap with respect to the orientation of their individual detection ranges M1. In addition, they may be oriented at an angle to each other in opposite directions in the vertical direction, as shown in FIG. 6. The vertically upper sensor 14 is oriented obliquely upward, while the vertically lower sensor 14 is oriented obliquely downward.

FIG. 6 further illustrates a possible orientation option for the central sensor 14*z*, which may be provided, for example, in addition to or as an alternative to one or more of the sensors 14 and 16. For example, the sensor 14*z* may be positioned on the top of the machine or even offset vertically upward from the rest of the machine using a spacing device 18. The spacing device 18, such as a support pole, may be removable or adjustable between a space-saving storage position and an operating position. The sensor 14*z* is oriented with respect to its detection range M1,M2 such that it at least partially detects the spatial area in front of and/or next to the machine 1 and located downward in the vertical direction, starting from the sensor.

Additionally or alternatively, the ground compaction machine may also include a GPS receiver 19, for example, on or within the machine cladding (FIGS. 1A to 2B) or on the spacing device 18 (FIG. 6). This makes it possible to determine the position of the machine 1, which may be used for control and/or locating purposes, for example.

With regard to the above-mentioned embodiment variants, in particular with regard to the orientation of one or more sensors, it is stated here as a precaution that a variety of further arrangement variants are possible beyond the given embodiment examples and are also encompassed by the invention. An essential aspect, particularly with respect to the arrangement of the sensors 14 of the sidewall detection device 13, is that detection of the presence of a sidewall adjacent to the ground compaction machine 1 is possible. Further, the individual orientation options in the vertical plane and/or in the horizontal plane may be combined with each other or applied to all of the existing sensors of the sidewall detection device 13 and/or the obstacle detection device 17.

In order to be able to recognize and/or locate the machine more easily in the working environment under certain circumstances, an indicating device, for example in the form of a visual (in particular signal lamp) and/or acoustic (in particular signal horn) signal device 20 may be provided, as indicated for example in FIGS. 1A and 6.

Figure 7A:
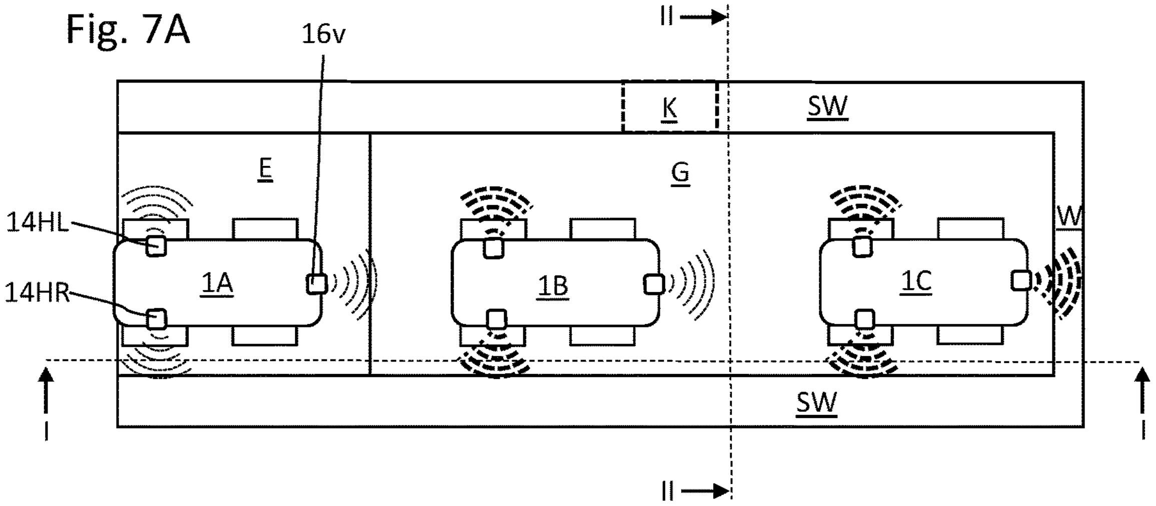
FIG. 7A: shows a top view of a movement sequence of a ground compaction machine in a trench.
Figure 7B:
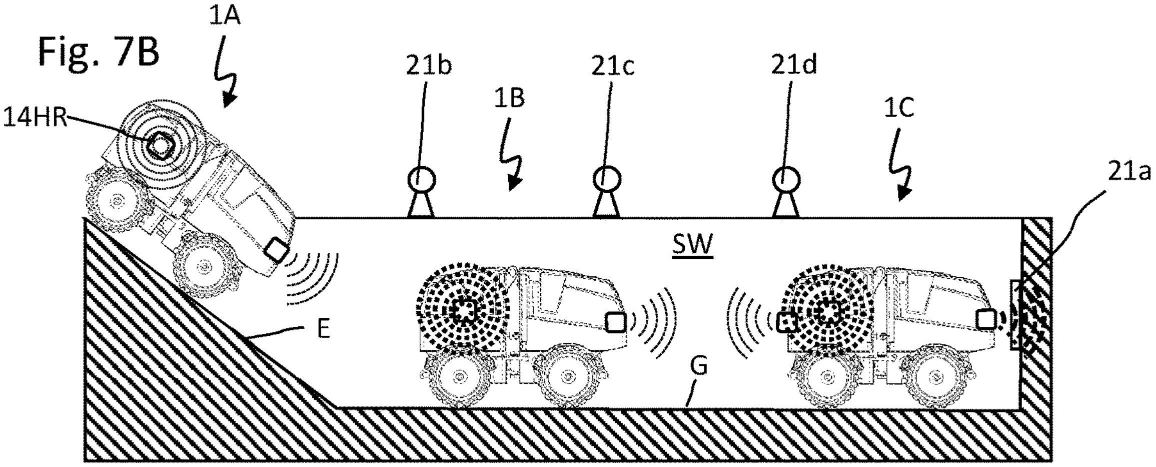
FIG. 7B: shows a side view of the movement sequence of FIG. 7A along line I-I.
Figure 7C:
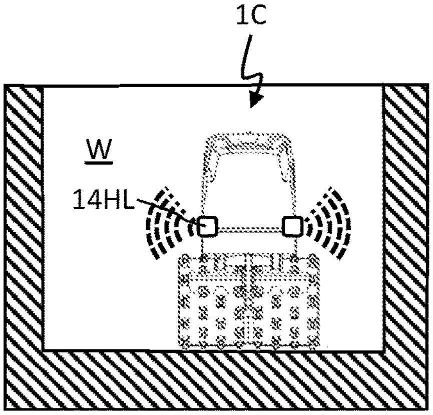
FIG. 7C: shows a cross-sectional view through the trench of FIG. 7A along line II-II.

FIGS. 7A to 7C now illustrate a possible operating sequence. FIG. 7A is a top view of a trench G with an entry ramp E and sidewalls SW and an end wall W. FIG. 7B is a vertical cross-sectional view along line I-I of FIG. 7A and FIG. 7C is a vertical cross-sectional view along line II-II of FIG. 7A. The ground compaction machine 1 is shown in three exemplary operating situations.

The sensors 14 of the sidewall detection device and 16 of the obstacle detection device 17, which are shown in FIGS. 7A to 7C by way of example only, are indicated in the figures with a thin line when they are not currently detecting a sidewall or an obstacle lying in the travel path, and with a thick line when they are currently detecting a sidewall or an obstacle lying in the travel path. Furthermore, only one obstacle detection sensor 16 directed in the direction of travel A and only one sensor 14 of the sidewall detection device 13 on each side are indicated in these figures merely for clarity. It will be appreciated that the individual sensors may be varied and/or combined in terms of type, positioning and orientation, as illustrated for example in the preceding figures.

In position 1A, the ground compaction machine 1A is entering the trench via ramp E. In this situation, the ground compaction machine 1 is in operator mode. Activation of the autonomous mode is blocked by the enabling device 15, since the sensors 14 do not detect a sidewall SW next to the ground compaction machine. In this operating phase, control of the ground compaction machine 1 is therefore only possible in the operating mode. At the same time, the obstacle detection device 17 does not detect any obstacle located in the travel path A of the ground compaction machine 1 via the sensor 16. The ground compaction machine 1 will thus move forward in the direction of travel A after the operator has entered corresponding travel commands and, in the present case, will move further into the trench until it reaches position 1B, for example.

Position 1B now shows an operating situation in which the sidewall detection device 13 detects the presence of sidewalls SW on both sides of the ground compaction machine via the sensors 14 (specifically 14HL and 14HR, i.e., simultaneously on both sides). This causes the enabling device 15 to enable operation in autonomous mode. The operator can now activate this operating mode and the ground compaction machine 1 would move autonomously in the trench in the direction of travel A, without requiring any operating inputs from an operator. This requires that the obstacle detection device 17 does not detect any obstacle lying in the travel path of the ground compaction machine in the direction of travel A. Ideally, the autonomous mode may be configured such that the ground compaction machine 1 moves completely independently or autonomously in the trench in the direction of travel A and makes travel direction, travel speed and steering direction decisions itself. This does not require any continuous or discontinuous feedback to an operator, for example via a so-called "heartbeat signal" and/or visual contact between a remote control and the machine, although it is certainly possible.

If the autonomous mode is activated at position 1B, the ground compaction machine continues to move autonomously within the trench in the direction of travel A to position 1C. The sidewall detection device may periodically check for the presence of the sidewalls SW. Continuation of the autonomous mode may then be provided, for example, only in the event that the presence of one or both sidewalls SW is detected essentially continuously. If the sidewall detection device cannot confirm this in an operating situation, at least the traveling operation of the ground compaction machine may be stopped. Alternatively, however, it is also possible, for example, for the enabling device to permit briefly occurring interruptions of the detection of the presence of a sidewall SW on one and/or both sides, as may occur, for example, when a lateral channel branch is present, as indicated in FIG. 7A with the channel branch A. The criteria under which such transitional continuation of the autonomous mode is possible despite loss of positive side-wall detection may vary. This may be done, for example, in a time- and/or distance-dependent manner Additionally or alternatively, a minimum requirement may be, for example, that at this moment the presence of a sidewall is detected at least on the opposite side and/or another sensor detecting on the same side of the machine, which is arranged, for example, in the direction of travel further in front, further behind, lower or higher and/or has a different detection range, detects the presence of a sidewall SW on this side (but at a different position in the direction of travel and/or height).

Between positions 1B and 1C, the obstacle detection device 17 does not detect any obstacle located in the travel path A of the ground compaction machine 1. Finally, however, in position 1C, the trench end wall E projects so close in front of the ground compaction machine that it is detected by the obstacle detection device 17 as an obstacle lying in the travel path. In order to avoid a collision with the trench wall (or another obstacle), the control unit 10 automatically stops the forward movement of the ground compaction machine 1 or the continuation of the travel movement in this direction. This may also end the autonomous mode and the ground compaction machine 1 may thus wait for a manual input, since it is then back in operator mode. Alternatively, however, when detecting the trench end wall in the autonomous mode, the control unit 10 may issue a reversing command and thus initiate a start of the traveling operation of the ground compaction machine in the opposite direction (i.e., in the direction of position 1B).

There are various possibilities to influence the traveling and working behavior of the machine within the trench independently of individual manual inputs. This may be done, for example, by marking devices 24 that are external to and detectable by the machine. Such markings may be placed inside the trench, outside the trench, especially at the edge of the trench, or virtually, for example, by relying on GPS and/or a local positioning system.

For this purpose, FIG. 7B uses the marking element 21*a* as an example to indicate the possibility of placing an indicator within the trench, for example at the end of the trench, which can be detected by the machine and which indicates the end of the trench for the machine 1. Said indicator may be, for example, an RFID transponder, an optoelectronically readable code, a colored marking sprayed on the wall or floor, or the like. Obviously, the ground compaction machine 1 then comprises a corresponding device for recognizing and decoding the external marking element, such as, for example, a scanner, a transmitting and receiving unit, a video camera, etc. However, not only route information, such as "end of work route", may be provided via such markers in a form that can be recognized and interpreted by the ground compaction machine 1, but additionally or alternatively also traveling and working information. Specifically, the marking element 21*a* may also be used to place a reversing mark, so that when the marking element 21*a* is detected and identified, the machine not only stops its approaching movement automatically, but then reverses automatically, resumes traveling operation, and moves away from the marking element 21*a* in the opposite direction. Obviously, this may be done anywhere within the trench and does not necessarily have to be done at a trench end wall. Additionally or alternatively, such markings may also be used to define a route or a permissible movement area, as exemplified in FIG. 7B with marking elements 21*b*, 21*c* and 21*d*. There, the marking elements are arranged along the route and in their entirety form a kind of virtual guide wire. In this context, the ground compaction machine 1 may, for example, have a current contact with at least one (or more) of the marking elements 21 in order to continue the travel movement. However, it is also possible here to tolerate distance- and/or time-dependent transitional interruptions in the detection of one of the marking elements 21*b*, 21*c* and 21*d* without interrupting the traveling operation.

Figure 8A:
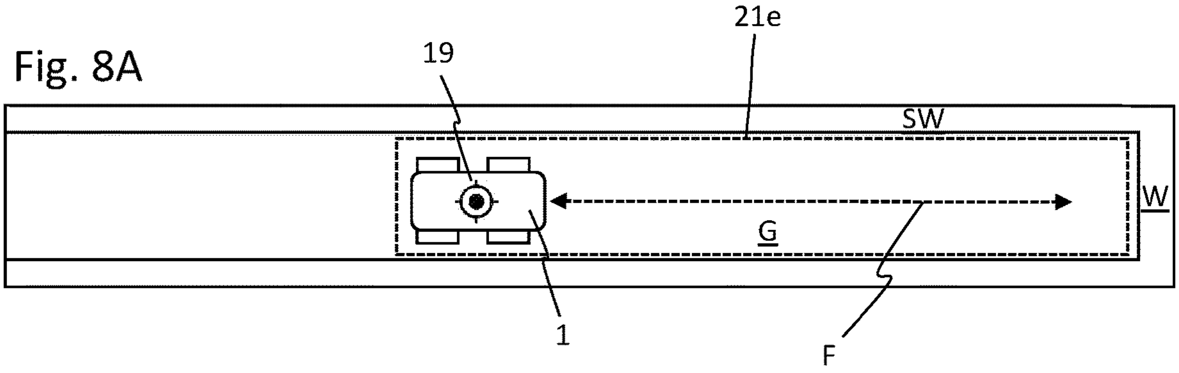
FIGS. 8A to 8C: show various movement schemes.

Additionally or alternatively, purely virtual markings may also be used, for example. For this purpose, it is preferred if there is a supplementary possibility to use the position of the machine in the terrain, whether relative to a reference point or absolute in specific position data, for example using GPS. In FIG. 8A, a virtual fence 21*e* is indicated for further illustration. The machine 1, which is equipped with a GPS receiver 19, constantly determines and monitors its own position during working operation in the auto-operate mode and checks whether it is within the area delimited by 21*e* or controls its travel track F such that it does not leave this area. It will be appreciated that other so-called "geofencing" options may also be applied here.

Figure 8B:
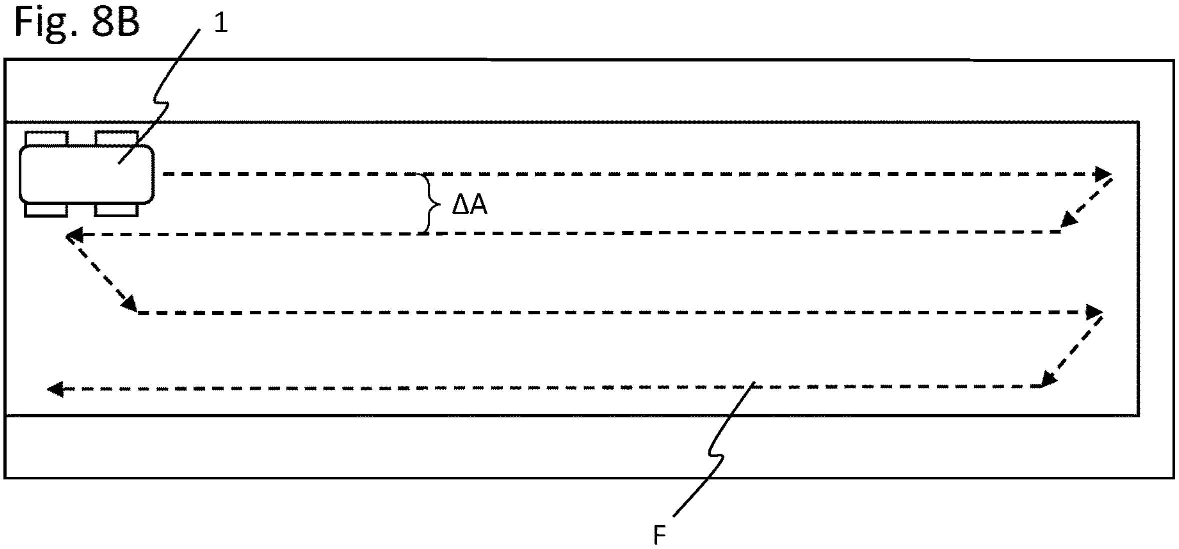
Figure 8C:
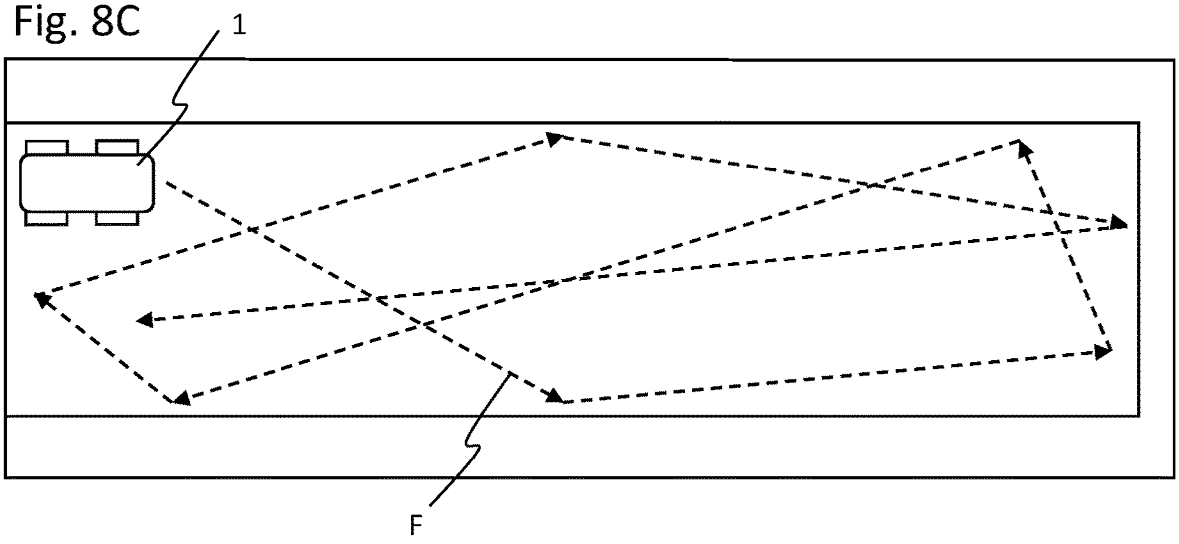

FIGS. 8A, 8B, and 8C further illustrate various movement modes that the ground compaction machine 1 may use as a basis for determining its own track F in autonomous mode. The ground compaction machine 1 is shown at the respective starting point for this purpose. The track F then reflects the track traveled by the ground compaction machine 1 from this start position in autonomous operation mode.

FIG. 8A shows the simplest case. Accordingly, the ground compaction machine 1 travels at least essentially one and the same path in reversing mode.

Alternatively, it is also possible, as shown for example in FIG. 8B, for the ground compaction machine 1 to offset the track by an offset distance ΔA extending horizontally and transversely to the main direction of travel with each change of direction of travel. From its starting position, the ground compaction machine 1 initially moves essentially parallel to the trench wall until it reaches the end of the trench on the right. There, it reverses its direction of travel (for example, due to detection of the end wall of the trench and/or a turn marking) and steers onto a return track offset by a distance of ΔA transverse to the direction of travel A. This process may be repeated several times as indicated in FIG. 8B.

FIG. 8C, on the other hand, shows a recorded travel path F as it may occur in chaotic travel path planning Here, the ground compaction machine 1 moves in a straight line until it encounters an obstacle in the travel path. The ground compaction machine 1 then steers in some direction and continues its travel path in a straight line until it again encounters an obstacle, such as a trench wall. It will be appreciated that various modifications are possible here. For example, the type of chaotic travel path planning may vary here. Additionally or alternatively, it is also possible that in this mode the area to be compacted is first mapped and then, when the area is completely mapped, the ground compaction machine 1 systematically travels over this area, as indicated for example in FIG. 8B.

Operation of the ground compaction machine in the autonomous mode may further be based on a plan, specifically a compaction plan. Said plan may be established depending on a number of planned passes and/or a desired ground stiffness. The planned traversal of the ground area to be compacted may include systematic and/or choatic traversal. Particularly in the case of systematic traversal over the ground surface to be compacted, the rolling plan may, for example, be defined by the control unit of the ground compaction machine such that tracks are travelled next to each other and/or partially overlapping and running parallel to each other. Additionally or alternatively, the area to be compacted may be specified, in particular externally, to determine the movement plan of the ground compaction machine, or the ground compaction machine may initially determine the area to be compacted itself, for example by means of a chaotic movement pattern in the initial phase, and, as soon as a closed ground area has been determined within limits defined, for example, by sidewalls, the ground compaction machine then traverses this area based on a self-defined, usually optimized, movement plan. This modification relates to the method according to the invention and to the configuration of the ground compaction machine according to the invention, irrespective of specific embodiment examples.

Figure 9:
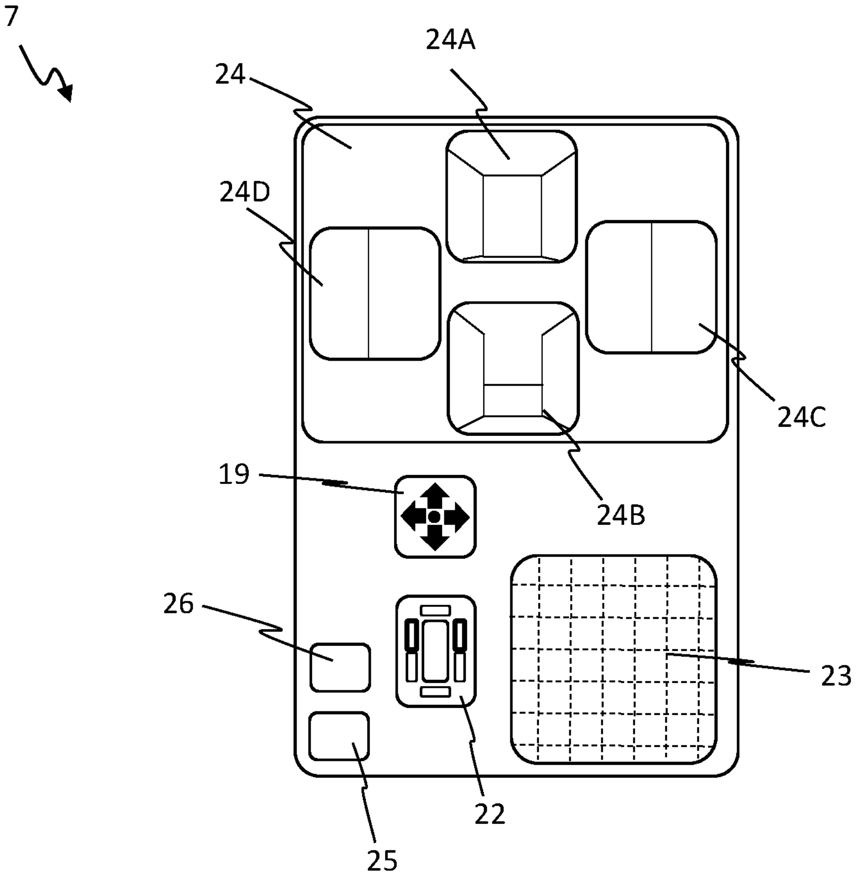
FIG. 9: shows a top view of a remote control.

FIG. 9 illustrates advantageous embodiments of a remote control 7 particularly suitable for use with a ground compaction machine 1 of the type described above. The special features of the remote control 7 relate in particular to ways of providing information to an operator when the ground compaction machine 1 is in autonomous mode.

Essential elements of the remote control 7 are first of all input elements via which the ground compaction machine can be operated in operator mode. Corresponding input elements 22 may be provided for this purpose, which enable the input of, for example, travel and steering inputs. Further, other input elements common to ground compaction machines 1 of the present type may be provided, such as an emergency stop switch, a start switch, etc. The remote control may further have a wired signal transmission connection or, preferably, be configured for wireless signal transmission between the ground compaction machine and the remote control. Corresponding devices are known in the prior art and are described, for example, in DE102010014902A1.

The peculiarities of the present remote control are that it also takes into account the possibility of operating the ground compaction machine in autonomous mode. As mentioned above, it is preferably a basic requirement for enabling an operation of the ground compaction machine 1 in the autonomous mode that the presence of at least one sidewall adjacent to the ground compaction machine 1 is detected, for example using one or more of the above described options. If this is the case, the autonomous mode could be activated. Thus, for example, the remote control may have an indication that indicates that the autonomous mode could be activated. Additionally or alternatively, for example, an indication may also be provided that provides feedback to the operator as to which areas of the sidewall detection device 13 and/or the obstacle detection device 17 are currently detecting or not detecting a sidewall and/or an obstacle. In FIG. 9, a detection display 22 is provided for this purpose, which in the present case displays this information in pictogram form. Additionally or alternatively, the remote control may further also have a position indication 23 that displays the current position of the ground compaction machine 1 relative to the remote control 7, in a stored map (for example, available online via appropriate internet services) and/or relative to a local reference system. This may be particularly advantageous for comparatively long distances when the ground compaction machine quickly moves out of the operator's field of vision, especially when driving in trenches. Additionally or alternatively, a further advantageous option is to display camera images, whether in intervals or in real-time, from one or more cameras 14*k* (FIG. 5) arranged on the ground compaction machine 1 as part of the sidewall detection device 13 and 16*k* (FIG. 1A) as part of the obstacle detection device 17 on the remote control in a corresponding display 24. This may include a front-facing (24A), rear-facing (24B), right-facing (24C), and left-facing (24D) camera view. One or more views assembled by software may also be used, for example to provide a so-called "bird's eye" perspective. The displayed images may furthermore be superimposed in the display(s) with further information, in particular evaluation results from sensors, for example with detected sidewall boundaries, a projection of the current travel path, identified objects, for example markings 21, etc. Of course, the remote control 7 may also include devices that can be perceived acoustically and/or tactilely, for example for signaling dangerous situations, etc.

As a further alternative, the remote control may include a "call function" 25. Actuation of this element triggers, for example, a horn sound at the ground compaction machine 1 and/or some other signal in order to be able to locate the ground compaction machine 1 more quickly in the terrain.

Finally, an input element 26 may be provided to activate and/or deactivate the autonomous mode. Additionally or alternatively, this may also be supplemented with a display to this effect, which indicates whether the ground compaction machine is currently being operated in autonomous mode or in operator mode. Additionally or alternatively, an indication may finally also be provided to indicate whether or not the remote control 7 is currently in signal connection with the ground compaction machine 1.

Figure 10:
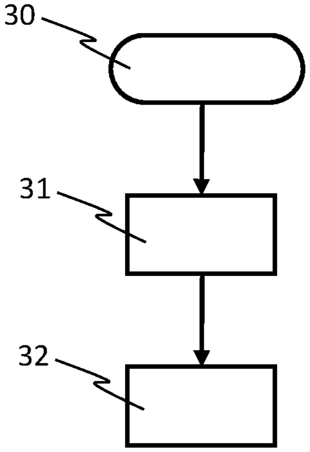
FIG. 10: shows a flowchart of operation of a ground compaction machine in operator mode.

FIG. 10 illustrates an example of a sequence of a method according to the invention when the operator mode is activated. This method, which is known in the prior art, is characterized by the fact that travel and steering specifications in particular are specified manually by the operator. Such a method is essentially characterized, after the start 30 of the machine, by manually entering a travel and/or steering command in step 31, which is converted into a corresponding control specification within the ground compaction machine by the control unit of the machine in step 32. Higher-level monitoring systems may also be provided here, such as monitoring of an existing signal connection between the ground compaction machine and the remote control and/or monitoring for obstacles located in the path of the ground compaction machine. The response of the machine control system to such events is then usually to stop and/or shut down the machine.

Figure 11:
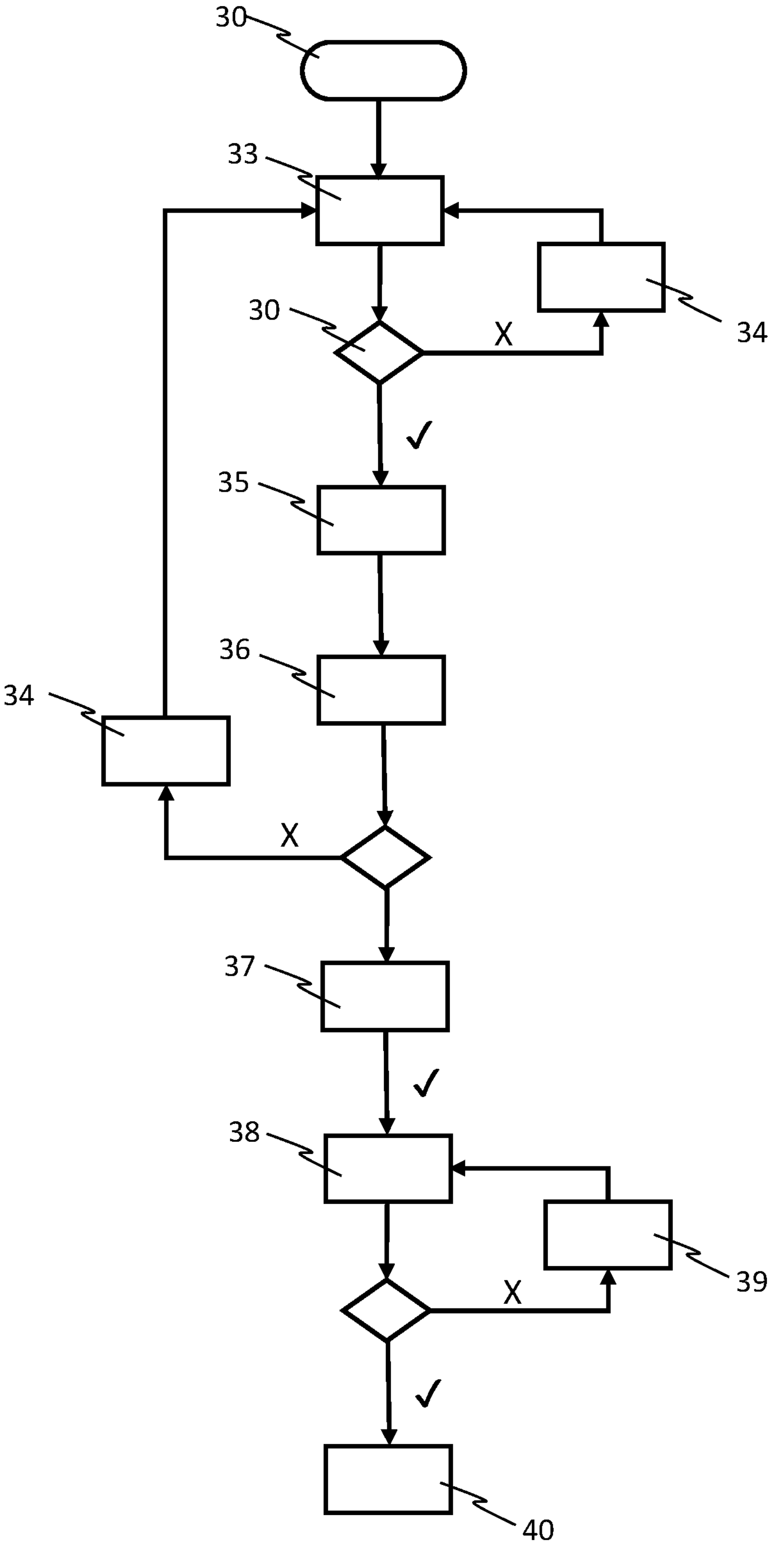
FIG. 11: shows a flowchart of operation of a ground compaction machine in autonomous mode.

FIG. 11, on the other hand, presents a possible method for operating the ground compaction machine in autonomous mode. After the start 30 of the ground compaction machine 1, the sidewall detection device may check in step 33 whether it detects the presence of a sidewall next to the ground compaction machine on one or both sides with one or more of the sensors provided for sidewall detection. This step 33 may be performed automatically with each start of the ground compaction machine 1 or, for example, may be performed only upon request by the operator via a corresponding operator input. If no sidewall is detected by the sidewall detection device, a new check may be performed cyclically in step 34. Alternatively, it is also possible here to wait for the next request from the operator, for example. If, on the other hand, the presence of a sidewall on one or, depending on the embodiment, both sides of the ground compaction machine is confirmed by one or more sensors, in particular simultaneously, the autonomous mode may be enabled by the enabling device, which may also be part of the machine control system per se, in step 35. This may also be additionally signaled, for example acoustically and/or optically on the ground compaction machine 1 itself and/or on a remote control. In an intermediate step, the ground compaction machine may further not only indicate the possibility of autonomous operation, but also the pending direction of travel (whether by manual input or by determination by the machine itself) and/or the side(s) on which the presence of a sidewall is detected.

In step 35, the operator may now activate the autonomous mode. A new check is then performed for the presence of a sidewall in accordance with the above specifications in step 36. If the presence of at least one sidewall (preferably one sidewall on each side of the machine) is detected by the sidewall detection device, the ground compaction machine changes to an autonomous mode ready for autonomous operation in step 37 and may then, for example, start traveling and working operation in the autonomous mode. If, on the other hand, a sidewall is not detected (any longer) or at least not to the extent specified in the specific individual case, this may be signaled to the operator accordingly, preferably acoustically and/or optically. Another check may then be provided according to step 34. Checking for the presence of the sidewall may be done cyclically in the background.

During ongoing working operation in autonomous mode according to step 38, continuous checking, whether intermittent or uninterrupted, is performed for the presence of one or more sidewalls. At the same time, especially in this operating phase, checking for obstacles located at least in the current travel path of the ground compaction machine may also be carried out (as in principle also in the context of the previous steps). If no obstacles and/or no interruptions in the sidewall detection are determined here, step 39 involves maintaining the autonomous mode and initiating a new checking step 38. This continues in a loop until, for example, an obstacle and/or loss of sidewall detection occurs. In step 40, for example, a machine stop (with or without engine shutdown) may be initiated and/or a corresponding signal may be given to the operator and/or the ground compaction machine may be reversed, etc.

Figure 12:
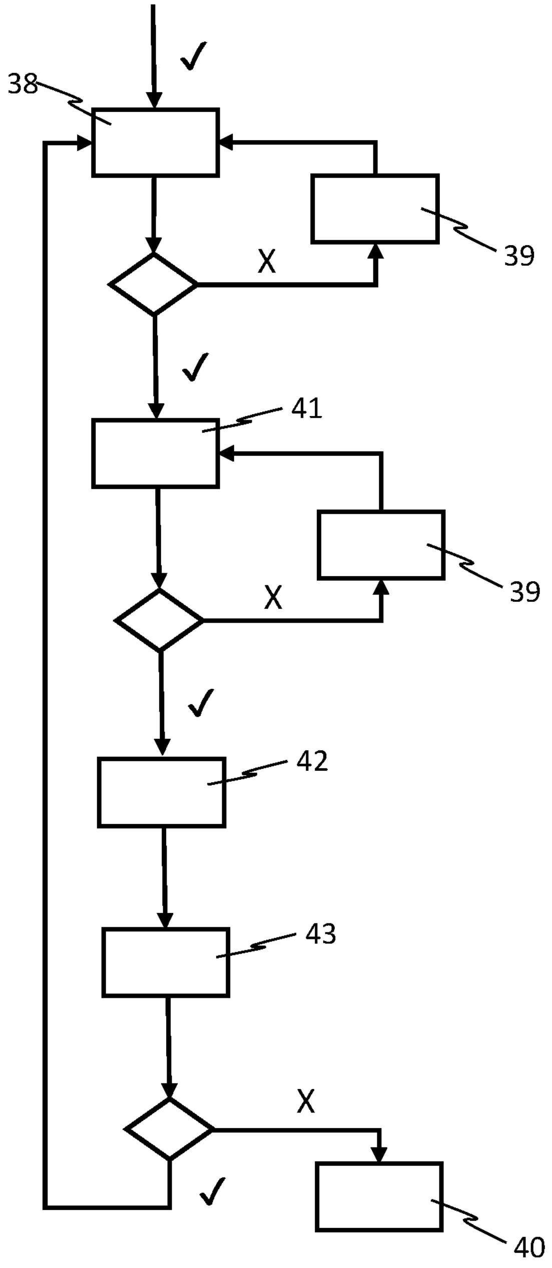
FIG. 12: shows a flowchart of a compensation function.

FIG. 12 illustrates the method sequence of a compensation function, for example, in the event that the presence of a sidewall is no longer detected by a sensor of the sidewall detection device. Various case constellations may occur, for which the continuation of the autonomous mode is nevertheless desired in this situation. This may be the case, for example, when the ground compaction machine is inside a trench and passes a trench branch after which, however, the trench continues. The method may follow step 38 of FIG. 11, as exemplified in FIG. 12. If it is determined in step 38 that one of the sensors of the sidewall detection device is no longer detecting a sidewall, step 41 may involve checking whether another sensor to the same side of the ground compaction machine is currently still detecting the presence of a sidewall. If so, continuation of the autonomous mode may be provided in accordance with step 42. In this case, however, it is preferred that this continuation is limited in a time- and/or distance-dependent manner. This means that with the loss of detection of a sidewall by at least one sensor in step 38 and the check according to step 41 after step 42, a distance and/or time countdown of a bridging window is started practically simultaneously in step 43, which exceptionally allows the continuation of the autonomous mode, although due to the loss of detection of the presence of a sidewall by the at least one sensor the requirements for starting the autonomous mode are not fulfilled. It is therefore also essential that this compensation function is intended in particular for ongoing working operation in autonomous mode and is not intended for starting autonomous mode. If the presence of a sidewall is detected again within the countdown, the autonomous mode continues in normal operation, for example according to step 38. If, on the other hand, no new detection of the presence of a sidewall occurs within the countdown, a machine stop may be initiated according to step 40, for example.

What is claimed is:

1. A method for controlling traveling operation of a self-propelled ground compaction machine with aid of a control unit which provides travel control signals to a travel drive system of the ground compaction machine, comprising:

operating the ground compaction machine in an autonomous mode, in which the control unit generates travel specifications itself and transmits the travel specifications in a form of the travel control signals to the travel drive system of the ground compaction machine, wherein operation of the ground compaction machine in the autonomous mode is only enabled by the control unit upon a sidewall detection device of the ground compaction machine detecting a simultaneous presence of a respective sidewall projecting relative to a contact surface of the ground compaction machine on two opposite sides of the ground compaction machine in an area in a horizontal direction transverse to a direction of travel of the ground compaction machine, wherein during traveling operation in the autonomous mode, in an event of an abrupt loss of detection of the presence of a sidewall at a first sensor position of the sidewall detection device, the control unit continues traveling operation in the autonomous mode in a time- and/or distance-dependent manner only if and as long as the presence of a sidewall at another sensor position of the sidewall detection device continues to be detected, to bridge temporary interruptions of a sidewall, wherein the traveling operation in the autonomous mode remains activated only as long as the sidewall detection device detects that both the following scenarios are cumulatively met:

a vertical height of the detected sidewalls exceeds a predetermined threshold, and a horizontal distance of the detected sidewalls in a horizontal direction transverse to a forward direction of travel of the ground compaction machine falls below a predetermined threshold.

2. The method according to claim 1, wherein the ground compaction machine is alternatively operated in an operator mode in which travel specifications specified by an operator via a manually operable input device are transmitted to the control unit and are transmitted by the control unit in the form of the travel control signals to the travel drive system of the ground compaction machine.

3. The method according to claim 1, wherein, when the ground compaction machine is in the autonomous mode, the control unit stops the traveling operation when the sidewall detection device no longer detects the simultaneous presence of the respective sidewalls projecting relative to the contact surface of the ground compaction machine.

4. The method according to claim 1, wherein obstacles lying in and/or against a current direction of travel of the ground compacting machine are detected with aid of an obstacle recognition device, wherein the control unit stops the traveling operation in the autonomous mode if an obstacle existing in and/or against the direction of travel is detected by the obstacle recognition device.

5. The method according to claim 1, wherein, with the ground compacting machine moving in the direction of travel in the autonomous mode, a reversing command, by which the direction of travel is switched to an opposite direction of travel, is generated by the control unit when:

an obstacle lying in the direction of travel is detected;

an end of a specified route has been reached;

an external marking element detectable by the ground compacting machine by a detection device is detected;

the detection of the external marking element detectable by the ground compacting machine by the detection device is interrupted;

an input is made via an input device manually operated by an operator.

6. The method according to claim 1, wherein the control unit controls an indicating device such that:

the indicating device indicates whether enabling requirements for operation in the autonomous mode are fulfilled, and/or the indicating device indicates that enabling requirements for operation in the autonomous mode are no longer met, and/or the indicating device indicates whether the ground compaction machine is currently being operated in autonomous mode, and/or the indicating device indicates whether an active signal transmission connection to a remote control exists or no longer exists, and/or further operating parameters are indicated, and/or a current position of the ground compaction machine is indicated.

7. The method according to claim 1, wherein the two opposite sides of the ground compaction machine are a left side and a right side.

8. A self-propelled ground compaction machine, comprising:

a drive unit, via which drive energy required for traveling operation of the ground compaction machine is provided;

a ground-contacting device, via which compaction of ground takes place, a control unit, which controls the traveling operation of the ground compaction machine, a sidewall detection device;

the control unit is configured such that the control unit controls the traveling operation of the ground compacting machine in an autonomous mode, wherein in the autonomous mode travel specifications are specified by the control unit, wherein operation of the ground compaction machine in the autonomous mode is only enabled by the control unit upon the sidewall detection device of the ground compaction machine detecting a simultaneous presence of a respective sidewall projecting relative to a contact surface of the ground compaction machine on two opposite sides of the ground compaction machine in an area in a horizontal direction transverse to a direction of travel of the ground compaction machine, wherein during traveling operation in the autonomous mode, in an event of an abrupt loss of detection of the presence of a sidewall at a first sensor position of the sidewall detection device, the control unit continues traveling operation in the autonomous mode in a time- and/or distance-dependent manner only if and as long as the presence of a sidewall at another sensor position of the sidewall detection device continues to be detected, to bridge temporary interruptions of a sidewall, wherein the traveling operation in the autonomous mode remains activated only as long as the sidewall detection device detects that both the following scenarios are cumulatively met:

a vertical height of the detected sidewalls exceeds a predetermined threshold, and a horizontal distance of the detected sidewalls in a horizontal direction transverse to a forward direction of travel of the ground compaction machine falls below a predetermined threshold.

9. The ground compaction machine according to claim 8, wherein as an alternative to the autonomous mode, the ground compaction machine is operable in an operator mode in which travel specifications are specified by an operator via a manually operable input device of the control unit.

10. The ground compaction machine according to claim 8, wherein the sidewall detection device has at least one distance sensor which is arranged on the ground compaction machine such that, with regard to viewing direction and/or detection range of the at least one distance sensor, the at least one distance sensor is at least partially oriented obliquely or parallel to a horizontal plane toward one of the two opposite sides of the ground compaction machine.

11. The ground compaction machine according to claim 8, wherein the sidewall detection device has at least two distance sensors, the detection ranges of which are each oriented at least partially in a direction of one of the two opposite sides of the ground compaction machine.

12. The ground compaction machine according to claim 8, wherein the sidewall detection device has at least one distance sensor on at least one of the two opposite sides of the ground compaction machine, via which a distance of the ground compaction machine from a sidewall projecting next to the ground compaction machine is determinable.

13. The ground compaction machine according to claim 8, wherein the sidewall detection device has at least one distance sensor on each of the two opposite sides of the ground compaction machine, via which in each case a distance of the ground compaction machine from sidewalls projecting next to the ground compaction machine on one of the two opposite sides is determinable.

14. The ground compaction machine according to claim 8, wherein the sidewall detection device has, on at least one of the two opposite sides of the ground compaction machine, at least two distance sensors which are arranged relative to one another such that detection ranges of the at least two distance sensors, as seen in a direction of travel of the ground compaction machine, extend at least partially one behind the other.

15. The ground compaction machine according to claim 8, wherein the ground compaction machine has at least two distance sensors having detection regions oriented toward one of the two opposite sides of the ground compaction machine, the at least two distance sensors being oriented such that detection ranges of the at least two distance sensors, as seen in a vertical direction of the ground compaction machine, extend at least partially one above the other.

16. The ground compaction machine according to claim 8, wherein the sidewall detection device has at least two distance sensors on at least one of the two opposite sides of the ground compaction machine, the at least two distance sensors carrying out a distance measurement in a mutually different manner.

17. The ground compaction machine according to claim 8, wherein at least one sensor is provided which is configured to detect an area lying in front of and/or behind the ground compaction machine in the direction of travel.

18. The ground compaction machine according to claim 8, further comprising a device for detecting at least one external and/or virtual marking.

19. The ground compaction machine according to claim 8, wherein an indicating device is provided for indicating at least one of the following operating parameters:

the autonomous mode is switched on and/or off;

the autonomous mode is active and/or inactive;

the simultaneous presence of the respective sidewall is currently being detected and/or not being detected;

an obstacle existing in the direction of travel in front of and/or behind the ground compaction machine is detected and/or not detected;

there is an active and/or inactive signal connection to a remote control.

20. The ground compaction machine according to claim 8, wherein the ground compaction machine is operable with a manually operable input device, wherein the manually operable input device has an indicating device for indicating at least one of the following operating parameters:

the autonomous mode is switched on and/or off;

the autonomous mode is active and/or inactive;

the simultaneous presence of the respective sidewall is currently being detected and/or not being detected;

at least one currently determined distance to at least one of the respective sidewalls detected by the sidewall detection device;

an obstacle existing in the direction of travel in front of and/or behind the ground compaction machine is detected and/or not detected;

there is an active and/or inactive signal connection to a remote control.

21. The ground compaction machine according to claim 8, wherein the ground compaction machine is a trench roller or a vibratory plate.

22. The ground compaction machine according to claim 8, wherein the two opposite sides of the ground compaction machine are a left side and a right side.

23. A ground compaction machine, wherein the ground compaction machine is configured to carry out the method according to claim 1.

* * * * *